United States Patent
Ito et al.

(10) Patent No.: US 10,865,065 B2
(45) Date of Patent: Dec. 15, 2020

(54) IMAGE READING DEVICE

(71) Applicant: BROTHER KOGYO KABUSHIKI KAISHA, Aichi-ken (JP)

(72) Inventors: Tetsuo Ito, Aichi (JP); Takashi Fujiwara, Aichi (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 14 days.

(21) Appl. No.: 16/258,314

(22) Filed: Jan. 25, 2019

(65) Prior Publication Data
US 2019/0238700 A1 Aug. 1, 2019

(30) Foreign Application Priority Data
Jan. 31, 2018 (JP) .................. 2018-014640

(51) Int. Cl.
*B65H 29/50* (2006.01)
*H04N 1/00* (2006.01)
*H04N 1/12* (2006.01)
*B65H 5/36* (2006.01)

(52) U.S. Cl.
CPC ............. *B65H 29/50* (2013.01); *B65H 5/36* (2013.01); *H04N 1/00602* (2013.01); *H04N 1/00615* (2013.01); *H04N 1/00689* (2013.01); *H04N 1/123* (2013.01); *B65H 2404/1421* (2013.01); *B65H 2404/1521* (2013.01); *H04N 2201/0081* (2013.01)

(58) Field of Classification Search
CPC ... B65H 1/08; B65H 1/12; B65H 1/14; B65H 1/18; B65H 5/36; B65H 29/12; B65H 29/125; B65H 29/14; B65H 29/20; B65H 29/22; B65H 29/50; B65H 2404/142; B65H 2404/1421; B65H 2404/14211; B65H 2404/152; B65H 2404/1521; H04N 1/00602; H04N 1/00615; H04N 1/123
See application file for complete search history.

(56) References Cited

U.S. PATENT DOCUMENTS 3,942,785 A * 3/1976 Stange ............... B65H 29/12
                                                    271/65
2005/0195450 A1* 9/2005 Shoji ................ H04N 1/00822
                                                    358/497

(Continued)

FOREIGN PATENT DOCUMENTS

JP    10-167545 A    6/1998
JP    2005-8283 A    1/2005

*Primary Examiner* — Prasad V Gokhale
(74) *Attorney, Agent, or Firm* — Kenealy Vaidya LLP

(57) ABSTRACT

An image reading device includes: a supply tray including a movable plate which moves from a first position to a second position according to a decrease in the number of sheet to be supported by a supply tray; a discharge guide including a discharge opening for discharging the sheet conveyed by a conveyance guide to a discharge tray, and moves from a third position to a fourth position according to the decrease in the number of the sheets to be supported by the supply tray; a first drive source and a first drive train that transmits a drive force from the first drive source to a discharge roller. The discharge roller discharges a sheet through a discharge opening by receiving the drive force from the first drive source.

8 Claims, 17 Drawing Sheets

(56) References Cited

U.S. PATENT DOCUMENTS

| | | | | |
|---|---|---|---|---|
| 2008/0193181 A1* | 8/2008 | Jeong | ................... | B65H 85/00 399/401 |
| 2016/0060054 A1* | 3/2016 | Ogasawara | ............. | B65H 5/36 271/9.13 |
| 2016/0176670 A1* | 6/2016 | Noso | ................... | B65H 31/02 271/306 |
| 2017/0279993 A1* | 9/2017 | Kakuta | ............. | H04N 1/00612 |
| 2017/0289375 A1* | 10/2017 | Ando | ................. | H04N 1/0066 |

* cited by examiner

IMAGE READING DEVICE

CROSS-REFERENCE TO RELATED APPLICATION

This application claims priorities from Japanese Patent Application No. 2018-014640 filed on Jan. 31, 2018, the entire subject matters of which is incorporated herein by reference.

TECHNICAL FIELD

The present disclosure relates to an image reading device.

BACKGROUND

JP-A-2005-008283 discloses a document feeding device which is an example of an image reading device of the related art. The document feeding device is provided with a sheet feed tray, a sheet discharge tray, and a conveyance guide. The sheet feed tray supports a supplied document. The sheet discharge tray is positioned below the sheet feed tray and supports the document to be discharged. The conveyance guide conveys the document from the sheet feed tray to the sheet discharge tray. In the middle part of the conveyance guide, an image reading position for reading an image on the document to be conveyed on the conveyance guide is set.

The sheet feed tray moves upward according to a decrease in the number of sheets supported by the sheet feed tray and approaches a document pickup part. The document feeding device further includes a swing conveyance part and a discharge roller. The swing conveyance part has a discharge opening for discharging the document conveyed by the conveyance guide to the sheet discharge tray. The swing conveyance part moves upward according to a decrease in the number of the documents supported by the sheet feed tray, thereby separating the discharge opening from the sheet discharge tray. Specifically, a link member is installed between the sheet feed tray and the swing conveyance part, and the discharge opening of the swing conveyance part moves upward and downward according to the movement of the sheet feed tray in upward and downward direction. The discharge roller discharges the sheet through the discharge opening. In the document feeding device, a configuration for transmitting a drive force to the discharge roller is not apparent.

An image reading device having the same configuration as that of the document feeding device described hereinabove is assumed to be adopted. The image reading device is provided with a supply tray including a movable body, a discharge guide, and a discharge roller. The discharge guide includes a discharge opening for discharging a sheet to a discharge tray. A link member is installed between a movable plate of the supply tray and the discharge guide. The discharge opening of the discharge guide ascends and descends according to the ascent and descent of the movable plate of the supply tray. The discharge roller discharges the sheet through the discharge opening.

However, since a configuration for transmitting a drive force to the discharge roller is not apparent in the image reading device, improvement in a speed of processing including a discharge operation of the sheet by the discharge roller and a movement operation of the discharge guide may be difficult to achieve.

SUMMARY

The present disclosure has been made in view of the above circumstances, and one of objects of the present disclosure is to provide an image reading device capable of achieving the improvement in the speed of the processing including the discharge operation of the sheet by the discharge roller and the movement operation of the discharge guide.

According to an illustrative embodiment of the present disclosure, there is provided an image reading device including: a supply tray configured to support a sheet to be supplied, the supply tray including a movable plate that is configured to be movable from a first position to a second position according to a decrease in the number of the sheet to be supported by the supply tray, the second position being higher than the first position; a discharge tray positioned below the supply tray, the discharge tray being configured to support the sheet to be discharged; a conveyance guide configured to convey the sheet from the supply tray to the discharge tray; a reading sensor configured to read an image on the sheet to be conveyed on the conveyance guide; a discharge guide including a discharge opening for discharging the sheet conveyed by the conveyance guide to the discharge tray, the discharge guide being configured to be movable from a third position to a fourth position according to the decrease in the number of the sheet to be supported by the supply tray, the fourth position being higher than the third position; a discharge roller configured to discharge the sheet through the discharge opening; a first drive source configured to generate a drive force; and a first drive train configured to transmit the drive force from the first drive source to the discharge roller. The first drive train transmits the drive force from the first drive source to the discharge roller when the discharge guide moves from the third position to the fourth position, the discharge roller being configured to discharge the sheet through the discharge opening by receiving the drive force from the first drive source.

DETAILED DESCRIPTION

Hereinafter, first to third exemplary embodiments according to the present disclosure will be described with reference to the drawings.

First Exemplary Embodiment

Figure 1:
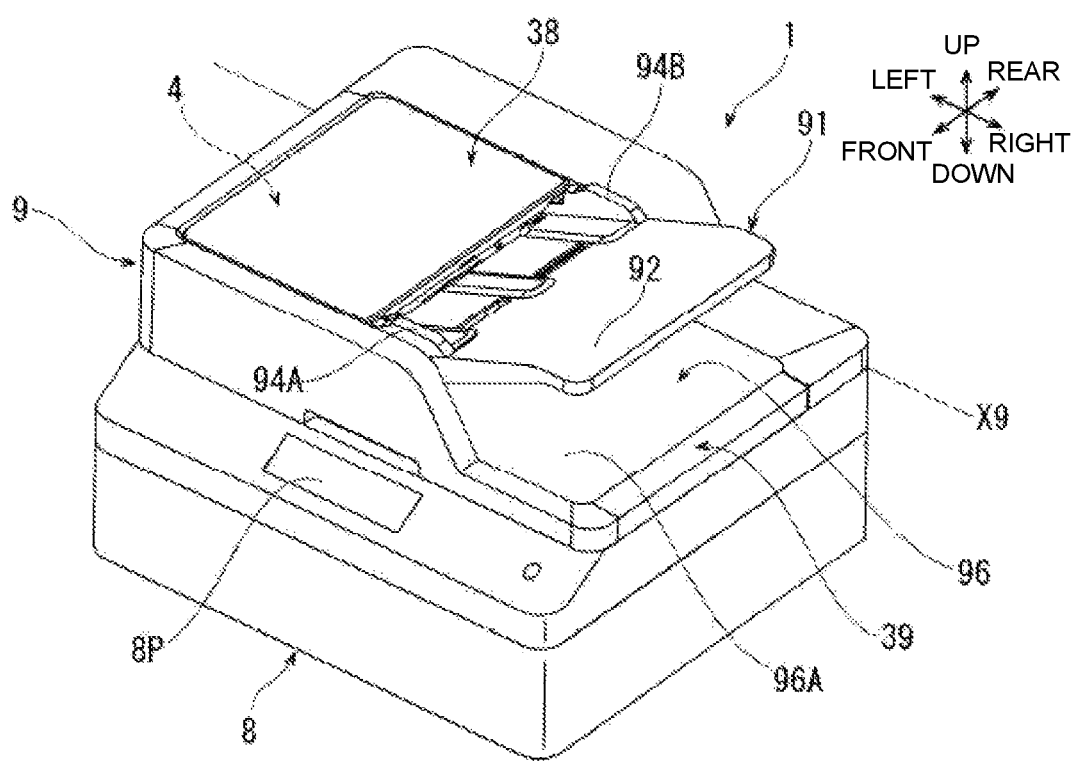
FIG. 1 is a perspective diagram illustrating an image reading device according to a first exemplary embodiment.
Figure 2:
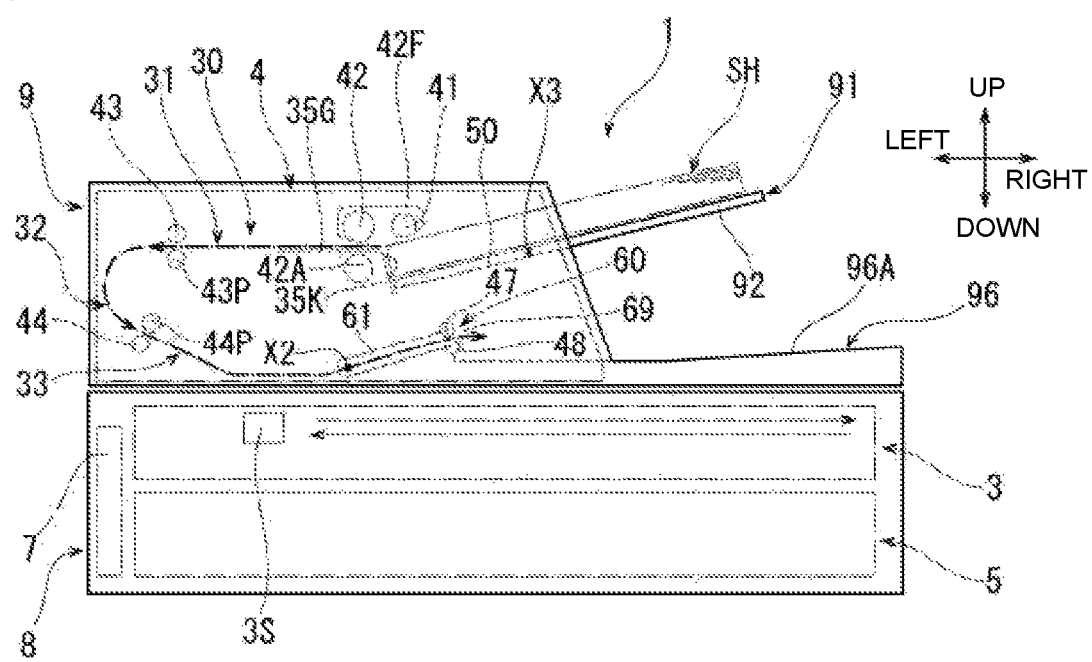
FIG. 2 is a schematic front diagram illustrating the image reading device according to the first exemplary embodiment.

As illustrated in FIG. 1, an image reading device 1 of a first exemplary embodiment is an example of a specific aspect of the image reading device of the present disclosure. In FIG. 1, a side on which an operation panel 8P is disposed is defined as a front side of a device, and a side which comes to the left when facing the operation panel 8P is defined as a left side, and respective directions of front, rear, left, right, upper, and lower sides are displayed. Then, each direction illustrated in each drawing after FIG. 2 is displayed corresponding to each direction illustrated in FIG. 1. Hereinafter, respective components provided in the image reading device 1 will be described while referring to FIG. 1 and the like.

<Overall Configuration>

As illustrated in FIGS. 1 to 4, the image reading device 1 is provided with a main body 8, an opening and closing part 9, an image forming unit 5, a reading unit 3, an automatic conveyance mechanism 4, and a controller 7. The main body 8 is a flat and approximately box-shaped body. As illustrated in FIG. 1, the operation panel 8P which is a touch panel and the like is provided on a front surface of the main body 8.

Figure 5:
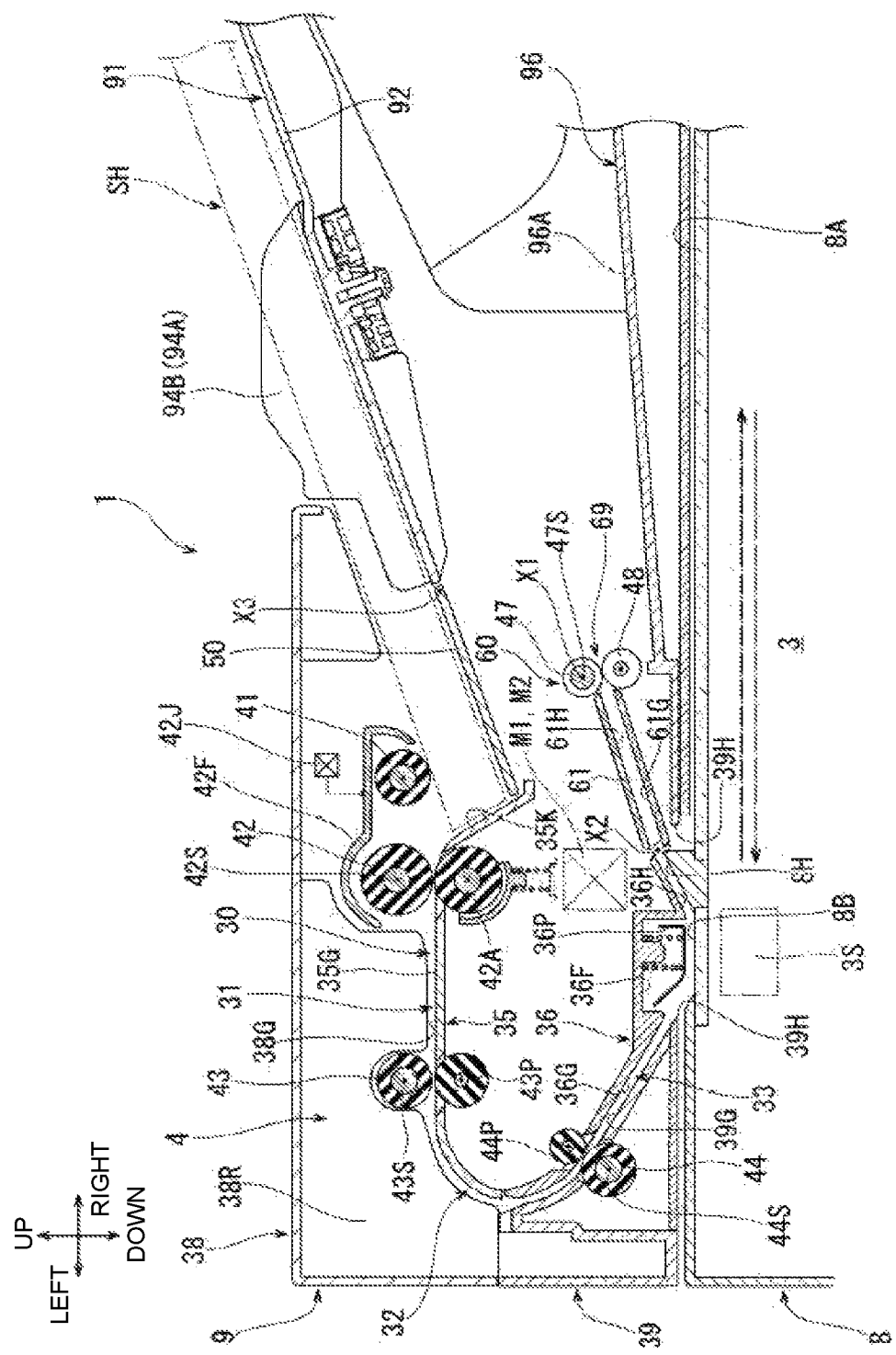
FIG. 5 is a partial cross-sectional diagram illustrating the image reading device according to the first exemplary embodiment.

As illustrated in FIG. 2, the image forming unit 5 is stored at a lower portion in the main body 8. The image forming unit 5 forms an image on a sheet by an ink jet method, a laser method, or the like. As illustrated in FIGS. 2 and 5, the reading unit 3 is positioned at an upper portion in the main body 8. The reading unit 3 is used when reading an image on a document. The automatic conveyance mechanism 4 is provided in the opening and closing part 9. The automatic conveyance mechanism 4 is used when allowing the reading unit 3 to read an image on a sheet SH while sequentially conveying the sheet SH supported by a supply tray 91 along a conveyance guide 30.

Figure 4:
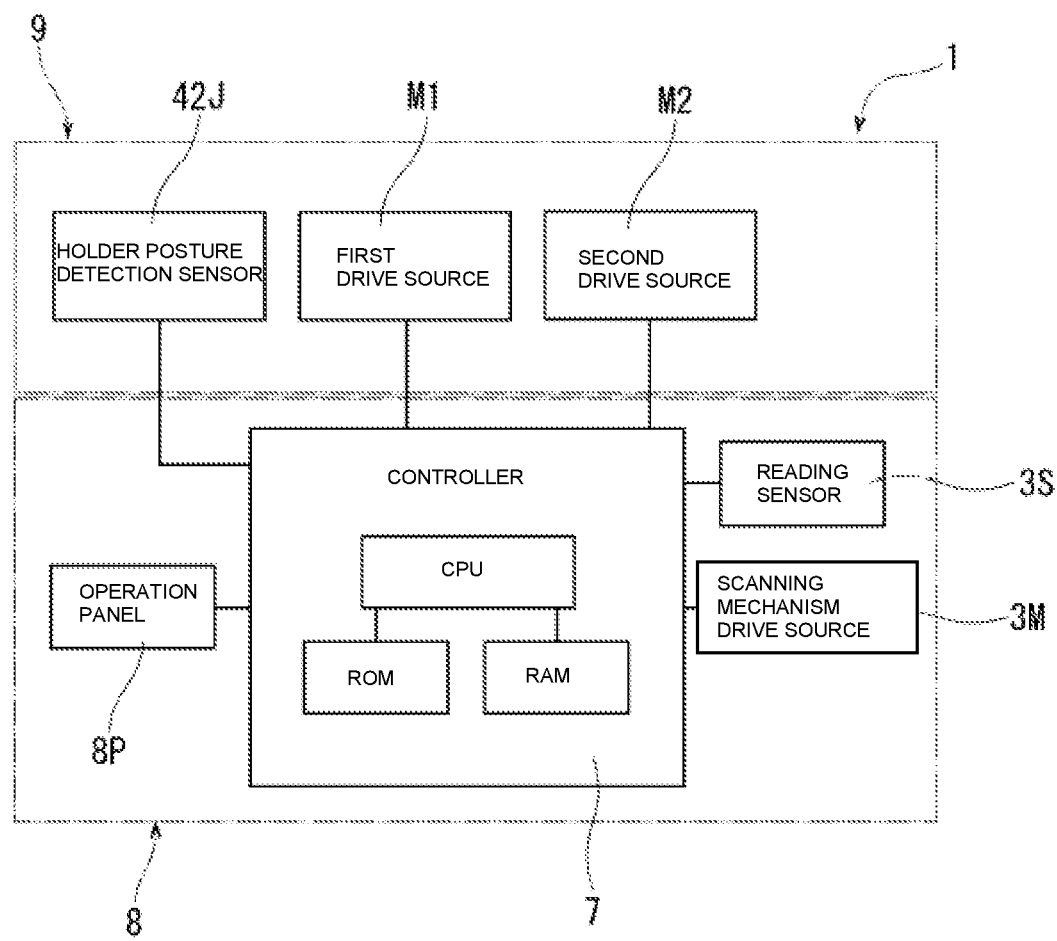
FIG. 4 is a block diagram illustrating the image reading device according to the first exemplary embodiment.

As illustrated in FIGS. 2 and 4, the controller 7 is stored at a position along a left side surface in the main body 8. The controller 7 is configured by a microcomputer including a CPU, a ROM, and a RAM. The ROM stores a program for the CPU to control various operations of the image reading device 1, a program for performing identification processing, and the like. The RAM is used as a storage region for temporarily recording data or signals used when the CPU performs the programs, or as a work region for data processing. The controller 7 controls the image forming unit 5, the reading unit 3, the automatic conveyance mechanism 4, and the operation panel 8P.

As illustrated in FIG. 5, platen glass is disposed on an upper surface of the main body 8, and a document supporting surface 8A having a large area is formed by an upper surface of the platen glass. Further, another platen glass is disposed on a left side further than the document supporting surface 8A on the upper surface of the main body 8, and an elongated reading surface 8B is formed in a front and rear direction by an upper surface of the other platen glass.

The document supporting surface 8A supports the document from below when the reading unit 3 reads an image on the document in a stationary state. The document which is an object to be read includes a sheet such as a sheet, an OHP sheet, and the like as well as a book, and the like.

When the reading unit 3 reads the image on the sheet SH conveyed one by one by the automatic conveyance mechanism 4, the reading surface 8B contacts the conveyed sheet SH from below. A guide protruding part 8H is provided between the document supporting surface 8A and the reading surface 8B on the upper surface of the main body 8. The guide protruding part 8H scoops up the sheet SH to be conveyed while contacting the reading surface 8B and guides the sheet SH so as to be inclined upward to the right.

Further, in the exemplary embodiment, an object whose image is read by using the document supporting surface 8A is described as a document, and an object whose image is read while being conveyed by the automatic conveyance mechanism 4 is described as a sheet. The document and the sheet may be substantially the same.

As illustrated in FIG. 1, the opening and closing part 9 is supported to be able to swing around an opening and closing axis center X9 extending in the right and left direction by a hinge, which is not illustrated, disposed at a rear end part of the main body 8. The opening and closing part 9 covers the document supporting surface 8A and the reading surface 8B from above in a closed state illustrated in FIGS. 1 and 5, and the like. Even though the drawing is omitted, the opening and closing part 9 is displaced to an opened position where the document supporting surface 8A and the reading surface 8B are exposed by swinging around the opening and closing axis center X9 so that the front end part thereof is displaced upward and rearward. Accordingly, a user can support the document which is an object to be read on the document supporting surface 8A.

Further, when describing a configuration, an internal structure, and the like of the opening and closing part 9, an posture of the opening and closing part 9 in a closed state is set as a reference in the up and down direction and the front and rear direction.

The reading unit 3 includes a reading sensor 3S stored at an upper portion in the main body 8 as illustrated in FIGS. 2 to 6, a scanning mechanism drive source 3M illustrated in FIG. 4, and a scanning mechanism, which is not illustrated, driven by the scanning mechanism drive source 3M. As the reading sensor 3S, a well-known image reading sensor such as a CIS (Contact Image Sensor), a CCD (Charge Coupled Device), and the like is used.

As illustrated in FIG. 5, the reading sensor 3S is positioned below the document supporting surface 8A and the reading surface 8B. The scanning mechanism, which is not illustrated, is driven by the scanning mechanism drive source 3M when reading the image on the document supported on the document supporting surface 8A, and the reading sensor 3S is reciprocated in the right and left direction below the document supporting surface 8A in the main body 8. Further, the scanning mechanism, which is not illustrated, is driven by the scanning mechanism drive source 3M when the reading sensor 3S reads the image on the sheet SH conveyed by the automatic conveyance mechanism 4, and the reading sensor 3S is stopped under the reading surface 8B in the main body 8. A position where the reading sensor 3S is stopped under the reading surface 8B is a predetermined stationary reading position.

Figure 6:
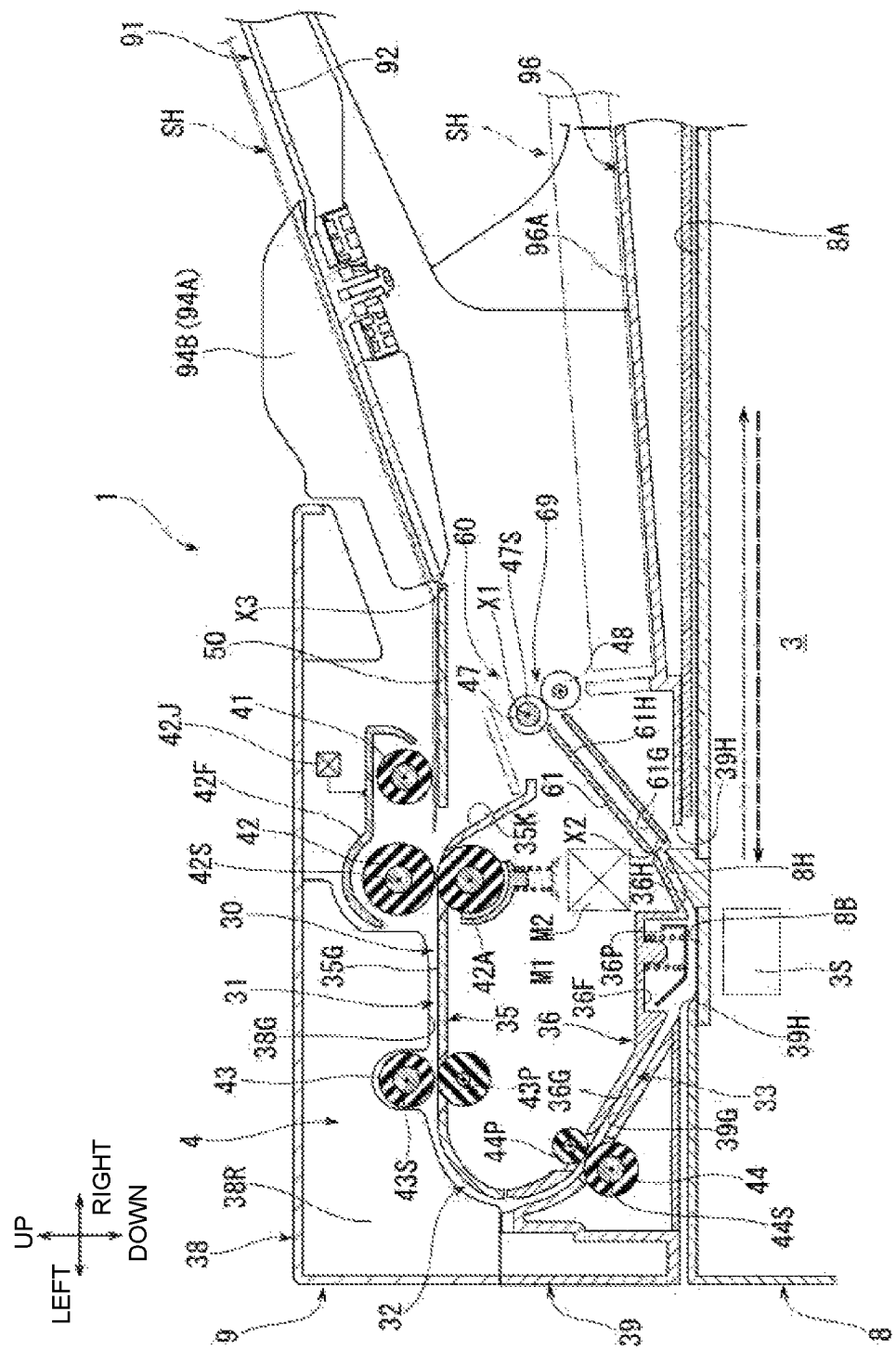
FIG. 6 is a partial cross-sectional diagram illustrating the image reading device according to the first exemplary embodiment.

As illustrated in FIGS. 5 and 6, the opening and closing part 9 is provided with a base member 39, a first chute member 35, a second chute member 36, and a cover member 38.

The base member 39 forms a bottom wall of the opening and closing part 9. In the base member 39, a rectangular hole 39H in which a region opposite to the reading surface 8B and the guide protruding part 8H is cut out in an approximately rectangular shape is formed. A conveyance surface 39G is formed at a portion positioned on the left side further than the rectangular hole 39H in the base member 39. A left end part of the conveyance surface 39G is curved so as to be inclined downward to the right by changing a direction from a downward direction. The conveyance surface 39G is inclined downward to a left end edge of the rectangular hole 39H.

The second chute member 36 is disposed above a left portion of the base member 39. A pressing member holding part 36F and guide surfaces 36G and 36H are formed in the second chute member 36. The pressing member holding part 36F is a recessed portion which is recessed upward at a position opposite to the reading surface 8B. In the pressing member holding part 36F, a pressing member 36P is held to be able to be displaced in the up and down direction. The pressing member 36P presses the sheet SH conveyed while contacting the reading surface 8B from above, thereby suppressing the sheet SH from floating from the reading surface 8B. The guide surface 36G is positioned on the left side further than the pressing member holding part 36F. A left end part of the guide surface 36G is curved along the left end part of the conveyance surface 39G of the base member 39. The guide surface 36G is inclined downward to the right along a portion inclined downward of the conveyance surface 39G of the base member 39. The guide surface 36H is positioned on the right side further than the pressing member holding part 36F. The guide surface 36H is inclined upward to the right along the guide protruding part 8H of the main body 8.

The first chute member 35 is disposed above the second chute member 36. A regulation surface 35K and a conveyance surface 35G are formed in the first chute member 35. The regulation surface 35K is inclined upward to the left from a right end part of the first chute member 35. The conveyance surface 35G is connected to an upper end of the regulation surface 35K and extends approximately horizontally to the left. A left end part of the conveyance surface 35G is curved so as to change a direction thereof from the left direction to the downward direction.

The cover member 38 is disposed above the first chute member 35. A guide surface 38G which is formed of lower end edges of a plurality of ribs 38R protruding downward is formed in the cover member 38. A right end part of the guide surface 38G is opposite to the conveyance surface 35G from above at a position deviated to the left side further than a connection part between the regulation surface 35K and the conveyance surface 35G in the first chute member 35. The guide surface 38G extends approximately horizontally to the left along the conveyance surface 35G of the first chute member 35. A left end part of the guide surface 38G is curved along the left end part of the conveyance surface 35G of the first chute member 35.

Figure 7:
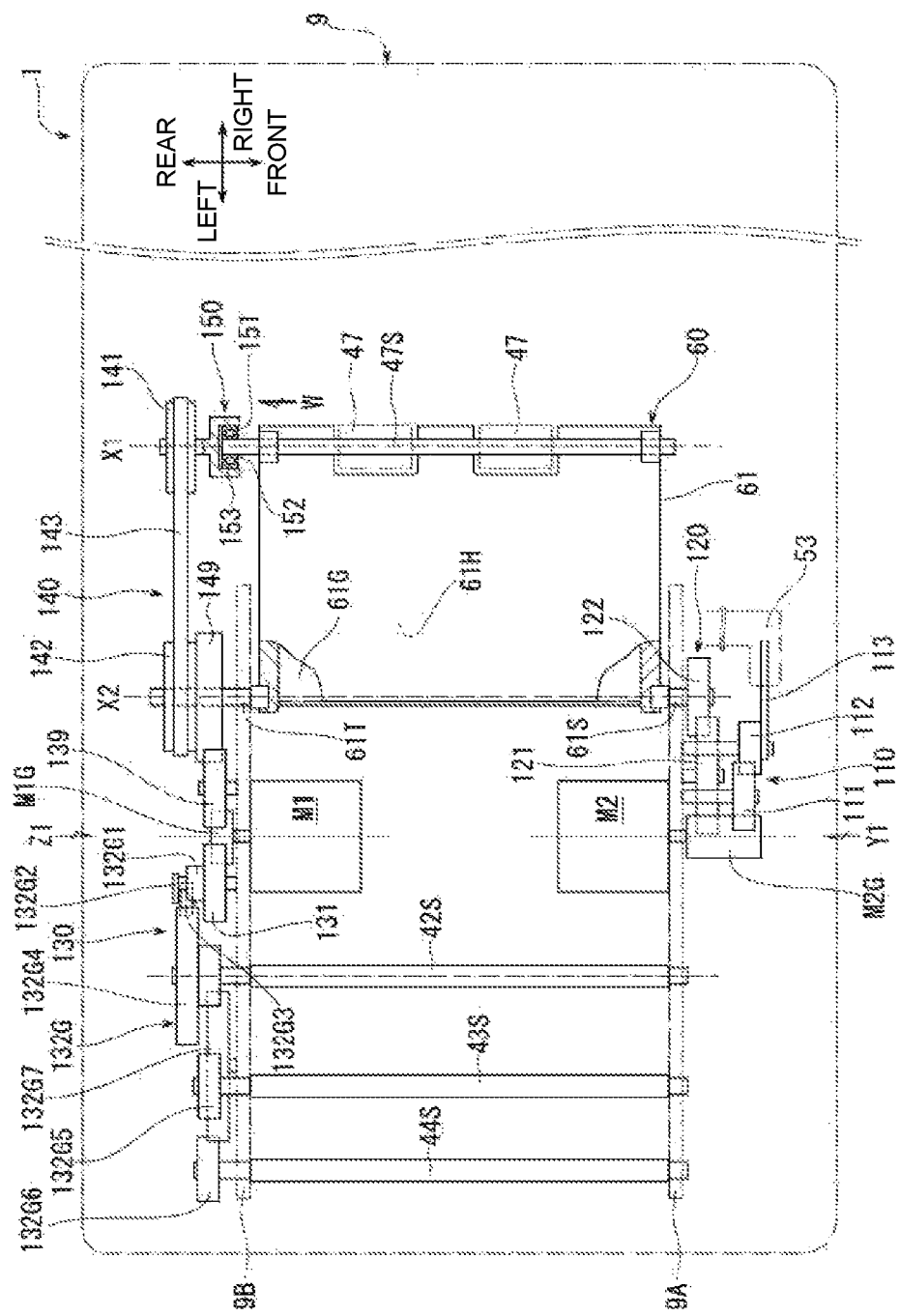
FIG. 7 is a schematic top diagram illustrating the image reading device according to the first exemplary embodiment.

As illustrated in FIG. 7, the opening and closing part 9 is provided with a front side frame 9A and a rear side frame 9B. The front side frame 9A is an example of a "second side frame" of the present disclosure. The rear side frame 9B is an example of a "first side frame" of the present disclosure.

Figure 8:
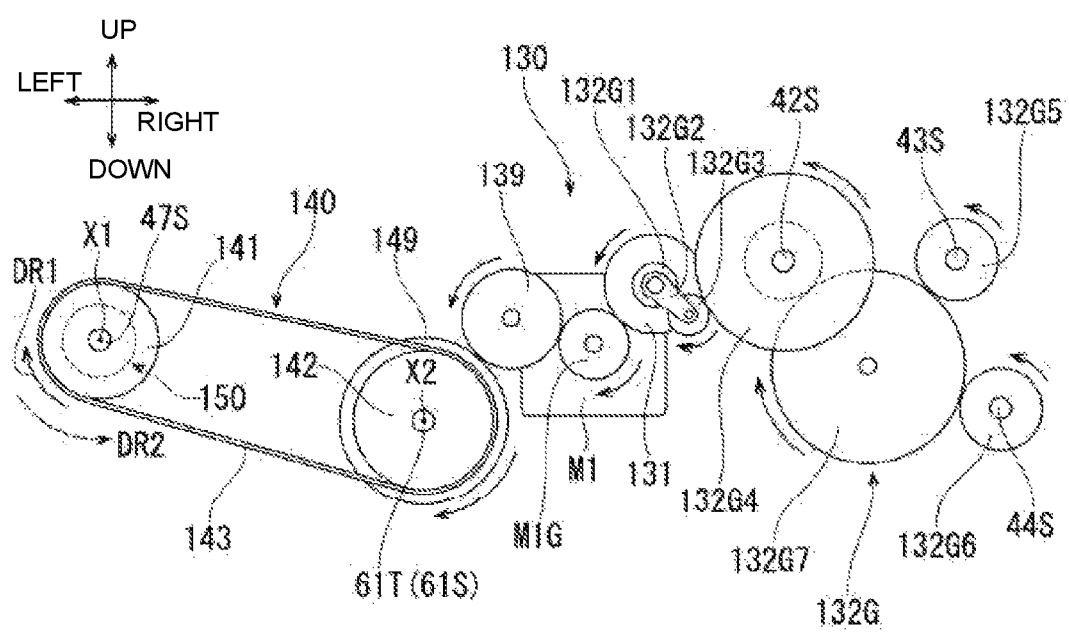
FIG. 8 is a schematic diagram illustrating a first drive source, a conveyance drive train, and the like when viewed from a direction of an arrow Z1 in FIG. 7.

The front side frame 9A is disposed so as to extend in the right and left direction on the front side of the opening and closing part 9, and forms a part of an internal frame of the opening and closing part 9. The rear side frame 9B is disposed so as to extend in the right and left direction on the rear surface side of the opening and closing part 9, and forms a part of the internal frame of the opening and closing part 9. The front side frame 9A and the rear side frame 9B are opposite to each other in the front and rear direction so that the guide surface 38G of the cover member 38, the regulation surface 35K and the conveyance surface 35G of the first chute member 35, the guide surfaces 36G and 36H of the second chute member 36, and the conveyance surface 39G of the base member 39, all of which are illustrated in FIG. 5 and the like, are sandwiched therebetween. Further, in FIG. 7, illustration of a supply tray main body 92 and a movable plate 50 of the supply tray 91 is omitted for easy description. Additionally, FIG. 7 illustrates that positions of a first drive source M1 and a second drive source M2 are deviated to the right side from a position lower than a rotation shaft 42S of a separation roller 42 for easy description. Also, FIG. 8 illustrates that the position of the first drive source M1 is deviated to the right side from the position lower than the rotation shaft 42S of the separation roller 42.

As illustrated in FIGS. 2, 3, 5, and 6, the opening and closing part 9 is provided with the conveyance guide 30 forming a part of the automatic conveyance mechanism 4, the supply tray 91 for supporting the sheet SH supplied to the conveyance guide 30, and a discharge tray 96 for supporting the sheet SH discharged from the conveyance guide 30.

As illustrated in FIG. 5, the supply tray 91 is positioned on the right side further than the first chute member 35, and is disposed above a right portion of the base member 39. The supply tray 91 includes the supply tray main body 92 and the movable plate 50. The supply tray main body 92 is gently inclined downward from a right end part side of the opening and closing part 9 to the left. The movable plate 50 is disposed so as to be adjacent to a left end part of the supply tray main body 92. The movable plate 50 extends in an approximately flat plate shape toward the regulation surface 35K of the first chute member 35. The movable plate 50 is covered with a right portion of the cover member 38 from above. The supply tray 91 supports the sheet SH supplied to the automatic conveyance mechanism 4 by the supply tray main body 92 and the movable plate 50.

The movable plate 50 is rotatably supported around a third axis center X3, the right end part of which extends in the front and rear direction. Even though the drawing is omitted, the movable plate 50 is rotatably supported by the front side frame 9A and the rear side frame 9B illustrated in FIG. 7.

Figure 3:
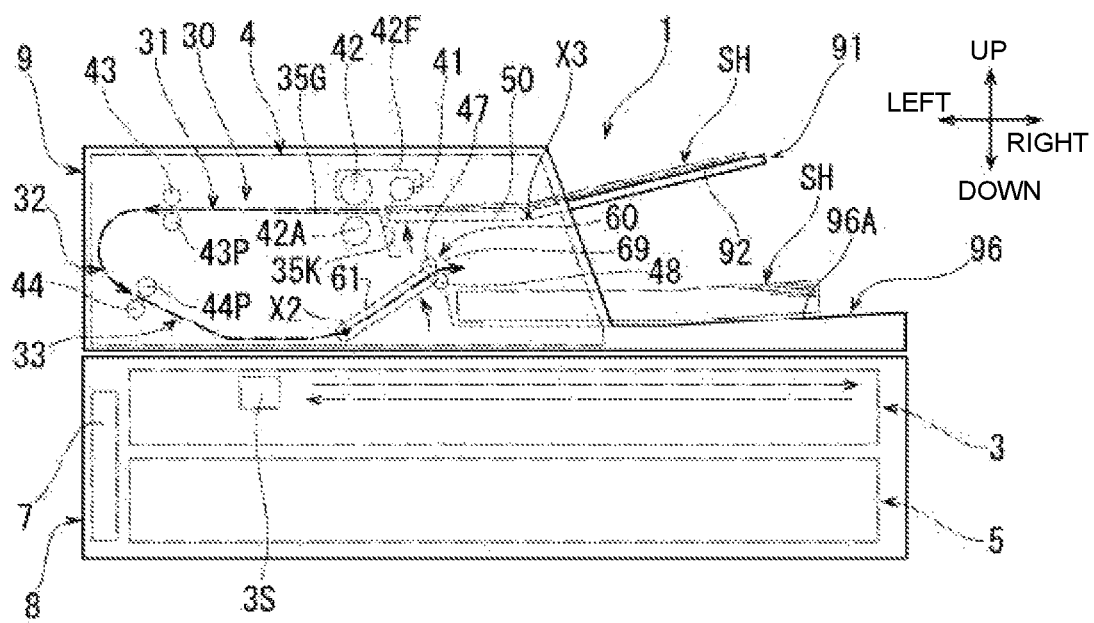
FIG. 3 is a schematic front diagram illustrating the image reading device according to the first exemplary embodiment.

As will be described later in detail, the movable plate 50 is configured to rotate from a first position illustrated in FIGS. 2, 5, and 9 to a second position illustrated in FIGS. 3, 6, and 10 by operating the second drive source M2 and a third drive train 110 illustrated in FIGS. 7 and 9, and the like, according to the decrease in the number of the sheets SH supported by the supply tray 91. The second position illustrated in FIG. 6 and the like is a position higher than the first position illustrated in FIG. 5 and the like.

As illustrated in FIGS. 1 and 5, two width regulation guides 94A and 94B are provided on the supply tray main body 92 so as to be respectively slidable in the front and rear direction. A plurality of types of the sheets SH having a different size supported on the supply tray 91 are sandwiched from the front side and the rear side in such a manner that the front width regulation guide 94A and the rear width regulation guide 94B approach each other or are separated from each other. Thus, the sheets SH having various sizes can be positioned based on a center part in a width direction of the supply tray 91 as a reference.

As illustrated in FIG. 5, the discharge tray 96 is formed on the right portion of the base member 39. That is, the discharge tray 96 is provided so as to be overlapped with the supply tray 91 at a position lower than the supply tray 91. In the discharge tray 96, an image is read by the reading sensor 3S, and the sheet SH conveyed by the automatic conveyance mechanism 4 is discharged. An upper surface of the discharge tray 96 is a sheet supporting surface 96A for supporting the sheet SH to be discharged.

The conveyance guide 30 forms a conveyance path for conveying the sheet SH from the supply tray 91 toward the discharge tray 96. Specifically, the conveyance guide 30 includes a first guide 31, a second guide 32, and a third guide 33.

The first guide 31 is configured to include an approximately horizontally extended portion of the conveyance surface 35G of the first chute member 35 and an approximately horizontally extended portion of the guide surface 38G of the cover member 38. The first guide 31 guides the sheet SH to be sent out from the supply tray 91 to the left.

The second guide 32 is configured to include a curved left end part of the conveyance surface 35G of the first chute member 35; a curved left end part of the guide surface 38G of the cover member 38; a curved left end part of the conveyance surface 39G of the base member 39; and a curved left end part of the guide surface 36G of the second chute member 36. The second guide 32 is connected to the first guide 31 and changes the conveyance direction of the sheet SH from the left direction to the right direction.

The third guide 33 is configured to include a downwardly inclined portion of the conveyance surface 39G of the base member 39; a downwardly inclined portion of the guide surface 36G of the second chute member 36; and the guide surface 36H of the second chute member 36. The third guide 33 is connected to the second guide 32 and guides the sheet SH toward the discharge tray 96.

The automatic conveyance mechanism 4 includes a discharge unit 60 for discharging the sheet SH guided by the third guide 33 to the discharge tray 96. The discharge unit 60 is formed by unitizing a discharge guide 61, a discharge roller 47, and a discharge pinch roller 48.

The conveyance surface 61G and the guide surface 61H are formed in the discharge guide 61. The conveyance surface 61G is positioned on the right side further than the guide protruding part 8H of the main body 8 and is inclined upward to the right. The guide surface 61H is positioned on the right side further than the guide surface 36H of the second chute member 36. The guide surface 61H is inclined upward to the right along the conveyance surface 61G. The discharge guide 61 includes a discharge opening 69 for discharging the sheet SH to the discharge tray 96. The discharge opening 69 is opened between a right end part of the conveyance surface 61G and a right end part of the guide surface 61H.

As illustrated in FIG. 7, in the discharge unit 60, the discharge guide 61 is an approximately rectangular cylindrical member formed so that a flat plate on which the conveyance surface 61G is formed and a flat plate on which the guide surface 61H is formed are opposite to each other in the up and down direction, and a front end edge and a rear end edge of both flat plates are connected to each other by a pair of front and rear side plates. The discharge guide 61 includes shaft parts 61S and 61T in which a second axis center X2 extending in the front and rear direction is set as an axis center. The second axis center X2 is parallel to the third axis center X3.

The front shaft part 61S is a cylindrical shaft protruding forward from a front and left corner part of the conveyance surface 61G and the guide surface 61H. The front shaft part 61S is rotatably supported by the front side frame 9A and protrudes forward further than the front side frame 9A.

The rear shaft part 61T is a cylindrical shaft protruding rearward from a rear and left corner part of the conveyance surface 61G and the guide surface 61H. The rear shaft part 61T is rotatably supported by the rear side frame 9B and protrudes rearward further than the rear side frame 9B.

Accordingly, the discharge guide 61 is rotatable around the second axis center X2. As illustrated in FIG. 5, a position of the second axis center X2 is set so as to be overlapped with a conveyance path formed by the third guide 33 of the conveyance guide 30 and the discharge guide 61.

In the discharge unit 60, the discharge roller 47 is disposed above the discharge opening 69, and the discharge pinch roller 48 is disposed below the discharge opening 69. Even though the drawing is omitted, a plurality of sets of discharge rollers 47 and discharge pinch rollers 48 are disposed to be spaced apart from each other in the front and rear direction.

The discharge roller 47 is fixed to a rotation shaft 47S having the first axis center X1 parallel to the second axis center X2 as an axis center. As illustrated in FIG. 7, a front end part of the rotation shaft 47S is rotatably supported by a front and right corner part of the discharge guide 61. A rear end part side of the rotation shaft 47S is rotatably supported by a rear and right corner part of the discharge guide 61. The rear end part of the rotation shaft 47S protrudes rearward further than the discharge guide 61. Accordingly, the discharge roller 47 is supported by the discharge guide 61 so as to be rotatable around the first axis center X1. The front and rear direction which is a direction in which the rotation shaft 47S of the discharge roller 47 extends is an example of the "an axis direction of the discharge roller". While the position of the second axis center X2 is constant, a position of the first axis center X1 varies depending on the rotation of the discharge guide 61.

Figure 9:
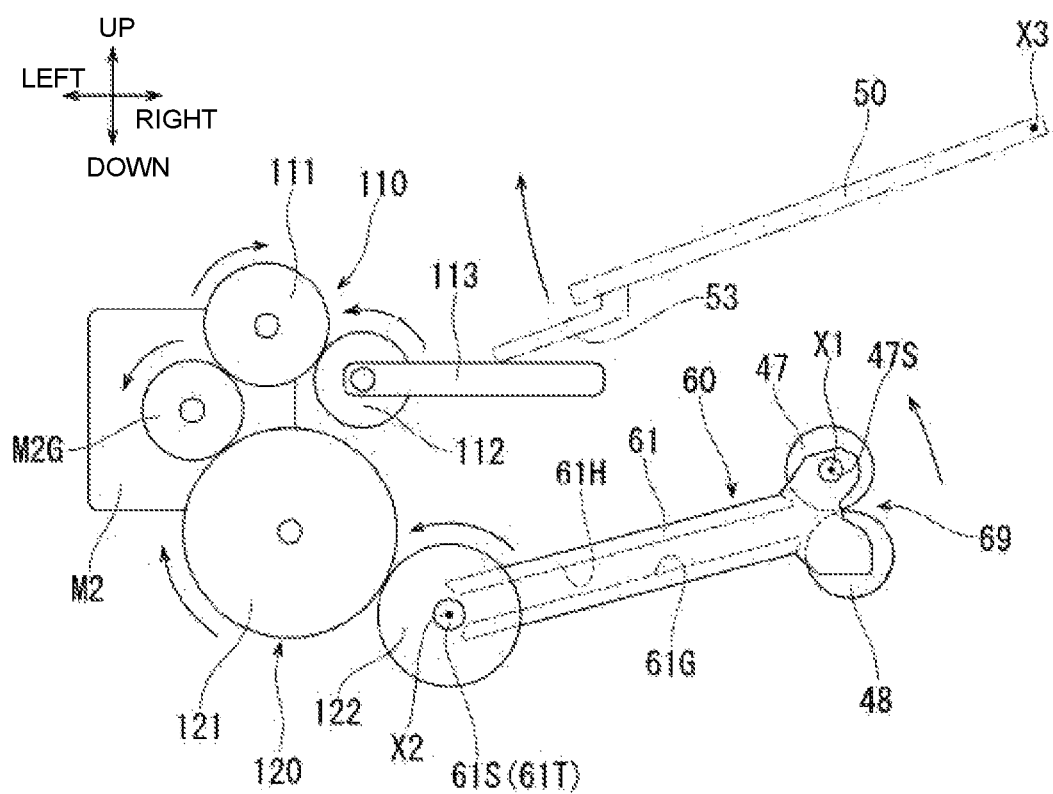
FIG. 9 is a schematic diagram illustrating a movable plate, a discharge unit, a second drive source, a second drive train, a third drive train, and the like when viewed from a direction of an arrow Y1 in FIG. 7, and is a diagram illustrating a state in which the movable plate is disposed at a first position and the discharge unit is disposed at a third position.

As illustrated in FIGS. 5 and 9, the discharge pinch roller 48 is rotatably supported by a right end part of the discharge guide 61 and is opposite to the discharge roller 47 from below. The conveyance surface 61G and the guide surface 61H of the discharge guide 61 guide the sheet SH toward a nip position between the discharge roller 47 and the discharge pinch roller 48.

As will be described later in detail, the discharge unit 60 is configured to rotate from a third position illustrated in FIGS. 2, 5, and 9 to a fourth position illustrated in FIGS. 3, 6, and 10 by operating the second drive source M2 and a second drive train 120 illustrated in FIGS. 7 and 9, and the like, according to the decrease in the number of the sheets SH supported by the supply tray 91. The fourth position illustrated in FIG. 6 and the like is a position higher than the third position illustrated in FIG. 5 and the like.

As illustrated in FIG. 5, the automatic conveyance mechanism 4 includes a supply roller 41, the separation roller 42, a retard roller 42A, a first conveyance roller 43, a first pinch roller 43P, a second conveyance roller 44, a second pinch roller 44P, the discharge roller 47, and the discharge pinch roller 48, for conveying the sheet SH along the conveyance guide 30. The discharge roller 47 and the discharge pinch roller 48 are a part of the discharge unit 60 described above.

As illustrated in FIG. 7, the rotation shaft 42S of the separation roller 42, a rotation shaft 43S of the first conveyance roller 43, and a rotation shaft 44S of the second conveyance roller 44 are rotatably supported by the front side frame 9A and the rear side frame 9B. Respective rear end parts of the rotation shafts 42S, 43S, and 44S protrude rearward further than the rear side frame 9B.

<Configuration of First Drive Source and Conveyance Drive Train>

As illustrated in FIGS. 7 and 8, the automatic conveyance mechanism 4 includes the first drive source M1 and a conveyance drive train 130 for driving the supply roller 41, the separation roller 42, the first conveyance roller 43, the second conveyance roller 44, and the discharge roller 47. Further, in the exemplary embodiment, with respect to each gear forming the first drive source M1 and the conveyance drive train 130, illustration of gear teeth formed on the outer peripheral surface thereof is omitted in FIGS. 7 and 8, and the like.

As illustrated in FIG. 5, the first drive source M1 is disposed between the first guide 31 and the third guide 33. As illustrated in FIG. 7, the first drive source M1 is mounted on a surface facing a front side of the rear side frame 9B. A drive shaft of the first drive source M1 protrudes rearward further than the rear side frame 9B, and a drive gear M1G is fixed to the drive shaft thereof. In the exemplary embodiment, the first drive source M1 is a stepping motor. The first drive source M1 generates a drive force by being controlled by the controller 7, thereby rotating the drive gear M1G in a clockwise direction illustrated in FIG. 8.

As illustrated in FIGS. 7 and 8, the conveyance drive train 130 is disposed behind the rear side frame 9B and is supported by a plurality of shaft parts protruding rearward from the rear side frame 9B. The conveyance drive train 130 includes a gear 131 which is positioned on a left and upper side with respect to the drive gear M1G and is engaged with the drive gear M1G; and a plurality of gear groups 132G which transmit a drive force from the first drive source M1 via the gear 131. The plurality of gear groups 132G include a sun gear 132G1 integrally rotating with the gear 131 and a planetary gear 132G3 connected to the sun gear 132G1 by an arm 132G2. Further, the plurality of gear groups 132G include gears 132G4, 132G5, 132G6, and 132G7. The gear 132G4 integrally rotates with the rotation shaft 42S of the separation roller 42 by being engaged with the planetary gear 132G3. The gear 132G5 integrally rotates with the rotation shaft 43S of the first conveyance roller 43 by transmitting the drive force from the gear 132G4 via the gear 132G7. The gear 132G6 integrally rotates with the rotation shaft 44S of the second conveyance roller 44 by transmitting the drive force from the gear 132G4 via the gear 132G7. Further, when the jammed sheet SH is removed in the conveyance guide 30, the gears 132G4, 132G5, and 132G6 become freely rotate by separating the planetary gear 132G3 from the gear 132G4. As a result, the jammed sheet SH can be easily removed.

The plurality of gear groups 132G transmit the drive force from the first drive source M1 to the rotation shaft 42S of the separation roller 42, the rotation shaft 43S of the first conveyance roller 43, and the rotation shaft 44S of the second conveyance roller 44, and the separation roller 42, the first conveyance roller 43, and the second conveyance roller 44 are rotated in a direction in which the sheet SH is conveyed toward the reading sensor 3S stopped at a stationary reading position, that is, in a counter-clockwise direction illustrated in FIG. 8.

<Configuration of First and Second Pulleys, Timing Belt, and One-Way Clutch of First Drive Train>

The conveyance drive train 130 includes a first drive train 140 for transmitting the drive force from the first drive source M1 to the discharge roller 47. The first drive train 140 is disposed behind further than the rear side frame 9B. The first drive train 140 includes a gear 139, a gear 149, a second pulley 142, a timing belt 143, a first pulley 141, and a one-way clutch 150. The first pulley 141 is an example of a "first rotation body" of the present disclosure. The second pulley 142 is an example of a "second rotation body" of the present disclosure. The timing belt 143 is an example of a "belt" of the present disclosure.

The gear 139 is positioned on the right side with respect to the drive gear M1G and is engaged with the drive gear M1G The gear 149 and the second pulley 142 are formed as one member. The gear 149 and the second pulley 142 are rotatably inserted into the rear shaft part 61T of the discharge guide 61 independently. Accordingly, the second pulley 142 is rotatable around the second axis center X2 integrally with the gear 149 engaged with the gear 139.

The first pulley 141 is mounted on the rear end part of the rotation shaft 47S of the discharge roller 47 in a state where the one-way clutch 150 is interposed therebetween. The first pulley 141 is rotatable around the first axis center X1 together with the rotation shaft 47S of the discharge roller 47. The timing belt 143 is wound around the second pulley 142 and the first pulley 141. The timing belt 143 transmits the drive force from the first drive source M1 from the second pulley 142 to the first pulley 141.

The gears 139 and 149, the second pulley 142, the timing belt 143, and the first pulley 141 transmit the drive force from the first drive source M1 to the rotation shaft 47S of the discharge roller 47, and the discharge roller 47 is rotated in a direction in which the sheet SH is discharged to the discharge tray 96, that is, in the clockwise direction illustrated in FIG. 8. A rotation direction in which the discharge roller 47 discharges the sheet SH through the discharge opening 69 is defined as a first direction DR1. A rotation direction opposite to the first direction DR1 is defined as a second direction DR2.

A gap between the second axis center X2 of the second pulley 142 and the first axis center X1 of the first pulley 141 does not change even though the discharge guide 61 rotates. Therefore, when the discharge guide 61 is stopped and when the discharge guide 61 rotates, tension of the timing belt 143 hardly fluctuates, whereby the drive force can be appropriately transmitted from the second pulley 142 to the first pulley 141.

Accordingly, when the discharge guide 61 is stopped and when the discharge guide 61 rotates, the first drive train 140 transmits the drive force from the first drive source M1 to the discharge roller 47, thereby making it possible to discharge the sheet SH through the discharge opening 69 by the discharge roller 47.

Figure 11:
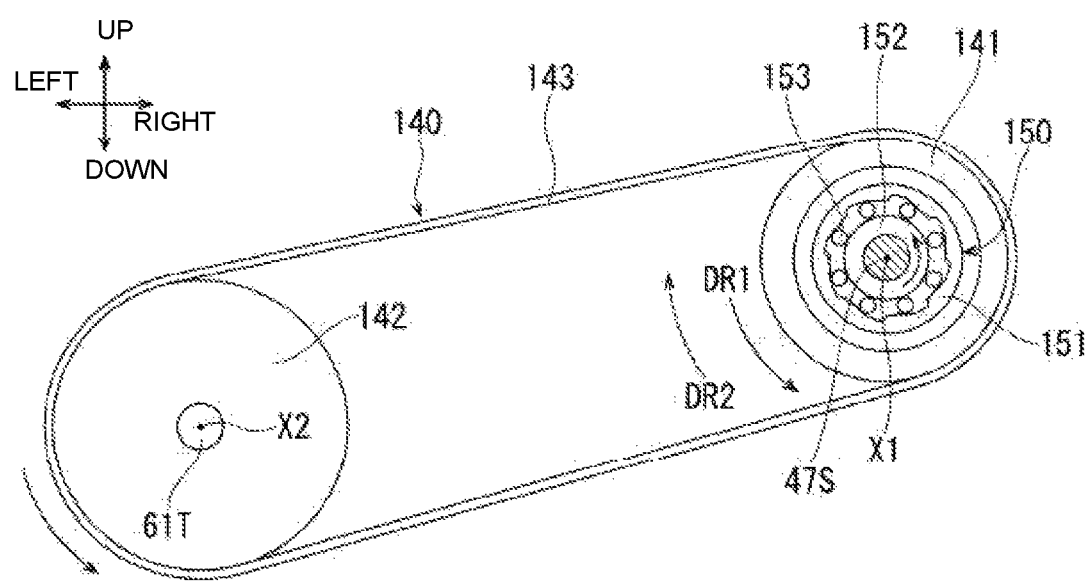
FIG. 11 is a schematic diagram illustrating a second pulley, a timing belt, a first pulley, a one-way clutch, a rotation shaft of a discharge roller when viewed from a direction of an arrow W in FIG. 7.
Figure 12:
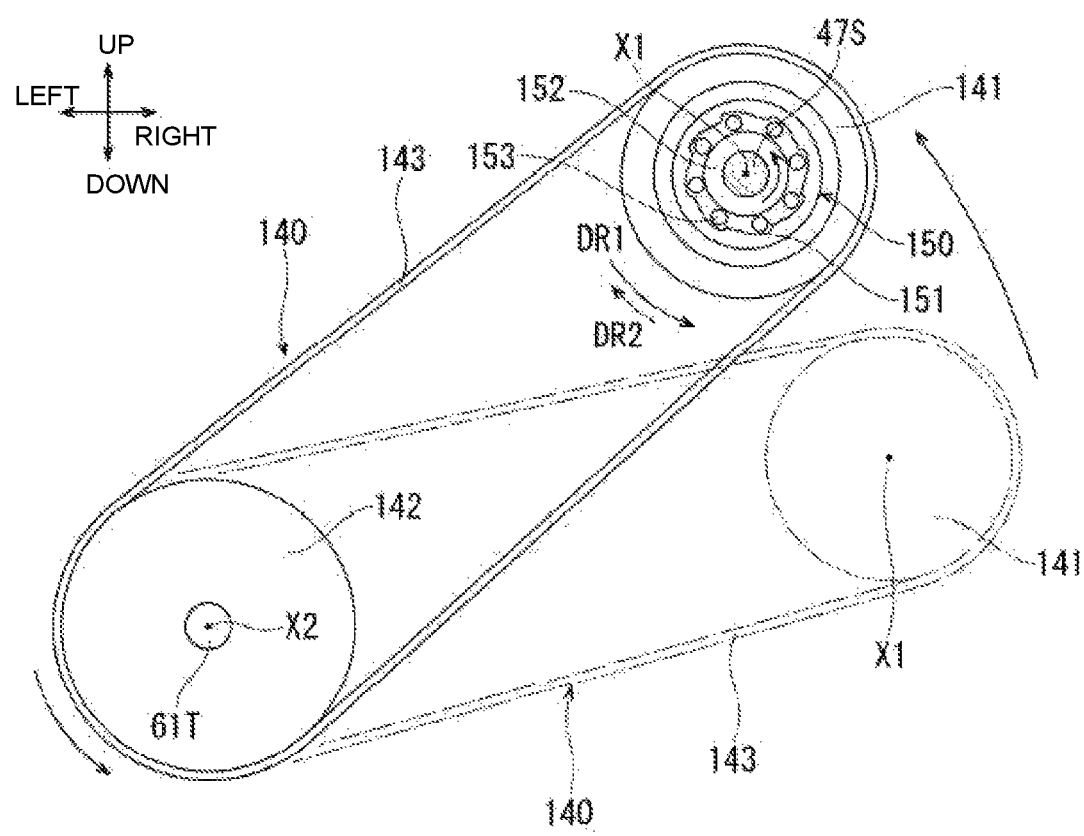
FIG. 12 is a schematic diagram same as that of FIG. 11, and is a diagram illustrating an operation of the one-way clutch when the discharge unit moves.

As illustrated in FIGS. 7, 11, and 12, the one-way clutch 150 has a well-known configuration in which an outer ring 151, an inner ring 152, and a plurality of rollers 153 are provided. The outer ring 151 is fixed to the first pulley 141. An inner peripheral surface of the outer ring 151 is formed with a recessed and protruding shape in which recessed parts recessed in a radially outward direction are formed at a plurality of places. The inner ring 152 is fixed to the rear end part of the rotation shaft 47S of the discharge roller 47 in a state where an outer peripheral surface thereof is opposite to the inner peripheral surface of the outer ring 151. Each roller 153 is disposed between the inner peripheral surface of the outer ring 151 and the outer peripheral surface of the inner ring 152.

As illustrated in FIG. 11, when the outer ring 151 attempts to perform relative rotation with respect to the inner ring 152 in the first direction DR1 in the one-way clutch 150, each roller 153 moves to a position where each roller 153 is bitten between the inner peripheral surface of the outer ring 151 and the outer peripheral surface of the inner ring 152. As a result, the outer ring 151 is fixed to the inner ring 152. That is, the one-way clutch 150 regulates the relative rotation of the first pulley 141 with respect to the rotation shaft 47S of the discharge roller 47 in the first direction DR1.

A case where the outer ring 151 attempts to perform the relative rotation with respect to the inner ring 152 in the first direction DR1 means that specifically, when the discharge guide 61 is stopped, a rotation speed of the first pulley 141 is increased from zero to a predetermined rotation speed by connection between the first pulley 141 and the second pulley 142 via the timing belt 143, and is constantly maintained at the rotation speed.

On the other hand, as illustrated in FIG. 12, when the outer ring 151 attempts to perform the relative rotation with respect to the inner ring 152 in the second direction DR2 in the one-way clutch 150, each roller 153 moves to a position where each roller 153 is not bitten between the inner peripheral surface of the outer ring 151 and the outer peripheral surface of the inner ring 152. As a result, the outer ring 151 is not fixed to the inner ring 152. That is, the one-way clutch 150 allows the first pulley 141 to perform the relative rotation with respect to the rotation shaft 47S of the discharge roller 47 in the second direction DR2.

A case where the outer ring 151 attempts to perform the relative rotation with respect to the inner ring 152 in the second direction DR2 means that specifically, when the discharge guide 61 rotates upward, the position of the first axis center X1 is changed upward and the first pulley 141 and the discharge roller 47 are also moved upward, whereby the rotation speed of the first pulley 141 temporarily decreases from the predetermined rotation speed due to the connection between the first pulley 141 and the second pulley 142 via the timing belt 143.

<Schematic Configurations of Supply Roller, Separation Roller, First and Second Conveyance Rollers, and the Like>

As illustrated in FIG. 5, the separation roller 42 is disposed at a position deviated to the left side further than the connection part between the regulation surface 35K and the conveyance surface 35G in the first chute member 35.

A holder 42F is rotatably supported by the rotation shaft 42S of the separation roller 42. The holder 42F protrudes toward the right side so as to be separated from the rotation shaft 42S and to exceed the regulation surface 35K.

The supply roller 41 is rotatably held at a right end part of the holder 42F. The supply roller 41 is provided at a position opposite to the movable plate 50 from above. The rotation shaft 42S and a transmission gear group, which is not illustrated, provided in the holder 42F transmit the drive force from the first drive source M1 to the supply roller 41, thereby rotating the supply roller 41 in a direction in which the sheet SH supported by the supply tray 91 is sent out to the conveyance guide 30. The supply roller 41 can be displaced in the up and down direction depending on the rotation of the holder 42F.

A holder posture detection sensor 42J is provided in the opening and closing part 9. The holder posture detection sensor 42J detects whether or not a posture of the holder 42F is an appropriate posture illustrated in FIGS. 5 and 6 and transmits the detected posture to the controller 7. In a state where the holder 42F is in the appropriate posture illustrated FIGS. 5 and 6, a lower end of the supply roller 41 has approximately the same height as that of the conveyance surface 35G of the first chute member 35. In this state, the supply roller 41 can appropriately send out the uppermost sheet SH among the sheets SH supported by the supply tray 91 toward the conveyance surface 35G, that is, toward a space between the separation roller 42 and the retard roller 42A.

The retard roller 42A is supported by the first chute member 35 at a position just below the separation roller 42 and is pressed against the separation roller 42. When there is one sheet SH to be nipped by the separation roller 42 and the retard roller 42A, rotation of the retard roller 42A is allowed by a torque limiter which is not illustrated. On the other hand, when there is a plurality of sheets SH to be nipped by the separation roller 42 and the retard roller 42A, the rotation of the retard roller 42A is stopped by the torque limiter which is not illustrated. As a result, the retard roller 42A applies a force for stopping the conveyance of the sheet SH other than the sheet SH in contact with the separation roller 42 with respect to the sheet SH.

The first conveyance roller 43 is disposed at a connection part between the first guide 31 and the second guide 32 so as to be opposite to the conveyance surface 35G of the first chute member 35 from above. The first pinch roller 43P is supported by the first chute member 35 and is pressed against the first conveyance roller 43. The first conveyance roller 43 and the first pinch roller 43P nip the sheet SH separated one by one by the separation roller 42 and the retard roller 42A, and then convey the nipped sheet SH toward the second guide 32.

The second conveyance roller 44 is disposed at a connection part between the second guide 32 and the third guide 33 so as to be opposite to the guide surface 36G of the second chute member 36 from below. The second pinch roller 44P is supported by the second chute member 36 and is pressed against the second conveyance roller 44. The second conveyance roller 44 and the second pinch roller 44P nip the sheet SH to be conveyed by the first conveyance roller 43 and the first pinch roller 43*p*, and then convey the nipped sheet SH toward the reading surface 8B, that is, toward the reading sensor 3S which is stopped at the stationary reading position.

The discharge roller 47 and the discharge pinch roller 48 nip the sheet SH which passes over the reading surface 8B and is guided by the discharge guide 61, and the nipped sheet SH is discharged through the discharge opening 69 toward the discharge tray 96.

<Configurations of Second Drive Source, Second Drive Train, and Third Drive Train>

As illustrated in FIGS. 7 and 9, and the like, the automatic conveyance mechanism 4 includes the second drive source M2, the second drive train 120, and the third drive train 110 for performing the rotation operation of the movable plate 50 and the discharge unit 60. Further, in the exemplary embodiment, with respect to each gear forming the second drive source M2, the second drive train 120, the third drive train 110, illustration of gear teeth formed on the outer peripheral surface thereof is omitted in FIGS. 7 and 9, and the like.

As illustrated in FIG. 5, the second drive source M2 is disposed between the first guide 31 and the third guide 33. As illustrated in FIG. 7, the second drive source M2 is mounted on a surface facing the rear side of the front side frame 9A. A drive shaft of the second drive source M2 protrudes forward further than the front side frame 9A, and a drive gear M2G is fixed to the drive shaft. In the exemplary embodiment, the second drive source M2 is a stepping motor. The second drive source M2 is controlled by the controller 7 and generates the drive force, thereby rotating the drive gear M2G in the clockwise direction and counter-clockwise direction illustrated in FIGS. 9 and 10.

Figure 10:
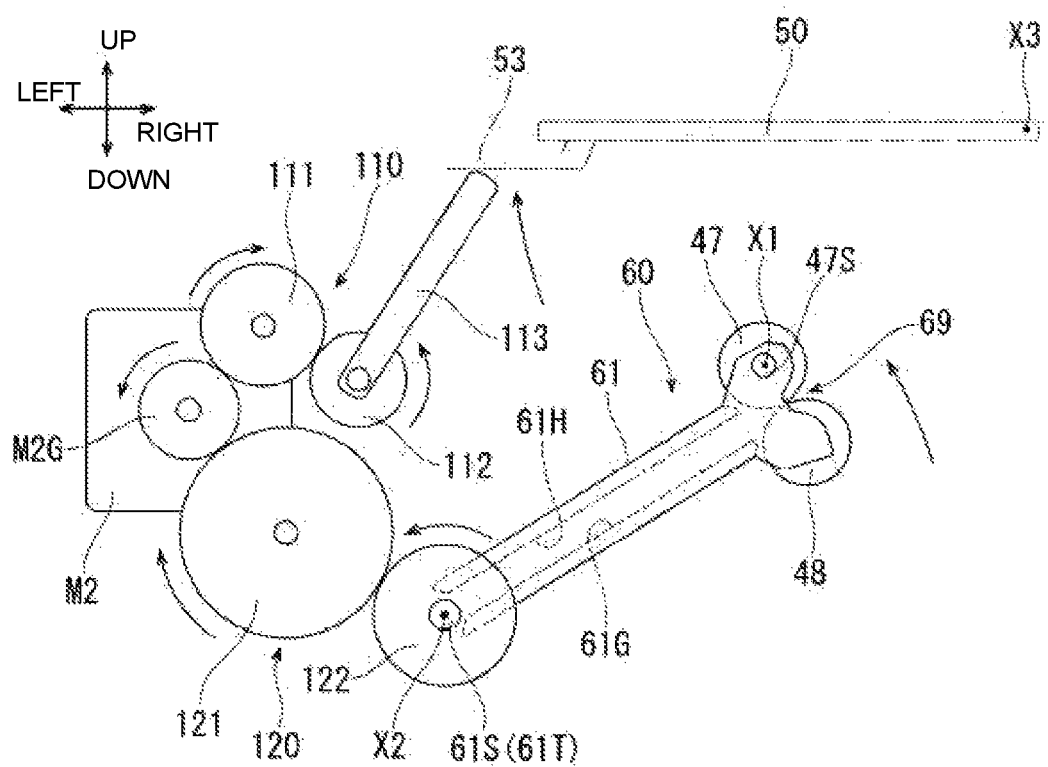
FIG. 10 is a schematic diagram same as that of FIG. 9, and is a diagram illustrating a state in which the movable plate is moved to a second position and the discharge unit is moved to a fourth position.

A plurality of arrows illustrated in FIGS. 9 and 10 indicate a rotation direction when the drive gear M2G rotates in the counter-clockwise direction illustrated in FIGS. 9 and 10. Further, when the drive gear M2G rotates in the clockwise direction illustrated in FIGS. 9 and 10, the rotation direction becomes a rotation direction opposite to each arrow illustrated in FIGS. 9 and 10.

As illustrated in FIGS. 7 and 9, the second drive train 120 and the third drive train 110 are disposed forward further than the front side frame 9A and are supported by a plurality of shaft parts protruding forward from the front side frame 9A.

The third drive train 110 includes a first gear 111, a second gear 112, and an arm 113. The first gear 111 is positioned rightward and upward with respect to the drive gear M2G and is engaged with the drive gear M2G The second gear 112 is positioned rightward and downward with respect to the first gear 111 and is engaged with the first gear 111. The arm 113 is fixed to a surface facing a front side of the second gear 112 and protrudes to the right.

The movable plate 50 has a passive part 53. The passive part 53 is bent after protruding forward from a front and left corner part of a rear surface of the movable plate 50 and protrudes to the left, and then abuts on a right end part of the arm 113 from above.

The second drive train 120 includes a third gear 121 and a fourth gear 122. The third gear 121 is positioned rightward and downward with respect to the drive gear M2G and is engaged with the drive gear M2G The fourth gear 122 is fixed to the front shaft part 61S of the discharge guide 61 so as to be integrally rotatable. The fourth gear 122 is positioned rightward and downward with respect to the third gear 121 and is engaged with the third gear 121. When the fourth gear 122 rotates, the discharge guide 61, and the discharge roller 47 and the discharge pinch roller 48 supported by the discharge guide 61 integrally rotate with the fourth gear 122.

The second drive train 120 and the third drive train 110 are branched between the second drive source M2, and the first gear 111 and the third gear 121, that is, are parallel to each other with the drive gear M2G as a branch point. In the exemplary embodiment, each gear such as the first gear 111, the third gear 121, and the like forming the second drive train 120 and the third drive train 110 is a general gear such as a spur gear, a helical gear, and the like.

Next, an operation of the third drive train 110 will be described. When the second drive source M2 rotates the drive gear M2G in the counter-clockwise direction illustrated in FIG. 9, the third drive train 110 including the first gear 111 transmits a drive force from the second drive source M2 to the movable plate 50, and rotates the movable plate 50 from the first position illustrated in FIG. 5 and the like to the second position illustrated in FIG. 6 and the like.

More specifically, in the third drive train 110, the first gear 111 engaged with the drive gear M2G rotates in the clockwise direction illustrated in FIG. 9; the second gear 112 engaged with the first gear 111 rotates in the counter-clockwise direction illustrated in FIG. 9; and a right end part of the arm 113 fixed to the second gear 112 ascends. As a result, as illustrated in FIG. 10, since the passive part 53 of the movable plate 50 is pushed upward, the movable plate 50 rotates around the third axis center X3 so as to displace a left end part thereof upward, and then moves to the second position illustrated in FIG. 6 and the like.

Further, when the second drive source M2 rotates the drive gear M2G in the clockwise direction illustrated in FIG. 10, the third drive train 110 including the first gear 111 is operated in a manner opposite to the above-mentioned operation, whereby the right end part of the arm 113 descends. As a result, since the passive part 53 of the movable plate 50 also descends as illustrated in FIG. 9, the movable plate 50 rotates around the third axis center X3 so as to displace the left end part thereof downward, and then moves to the first position illustrated in FIG. 5 and the like.

Next, an operation of the second drive train 120 will be described. When the second drive source M2 rotates the drive gear M2G in the counter-clockwise direction illustrated in FIG. 9, the second drive train 120 including the third gear 121 transmits the drive force from the second drive source M2 to the discharge unit 60, and rotates the discharge unit 60 from the third position illustrated in FIG. 5 and the like to the fourth position illustrated in FIG. 6 and the like.

More specifically, in the second drive train 120, the third gear 121 engaged with the drive gear M2G rotates in the clockwise direction illustrated in FIG. 9; and the fourth gear 122 engaged with the third gear 121 rotates in the counter-clockwise direction illustrated in FIG. 9. As a result, as illustrated in FIG. 10, since the discharge guide 61 rotates upward integrally with the fourth gear 122, the discharge unit 60 rotates around the second axis center X2 so as to displace the discharge opening 69 upward, and then moves to the fourth position illustrated in FIG. 6 and the like.

Further, when the second drive source M2 rotates the drive gear M2G in the clockwise direction illustrated in FIG. 10, the second drive train 120 including the third gear 121 is operated in a manner opposite to the above-mentioned operation, whereby the fourth gear 122 rotates in the clockwise direction illustrated in FIG. 10. As a result, since the discharge guide 61 rotates downward integrally with the fourth gear 122 as illustrated in FIG. 9, the discharge unit 60 rotates around the second axis center X2 so as to displace the discharge opening 69 downward, and then moves to the third position illustrated in FIG. 5 and the like.

As illustrated in FIG. 5, when the movable plate 50 is at the first position, the left end part of the movable plate 50 is at a position opposite to a lower end part of the regulation surface 35K of the first chute member 35, and an inclination angle of an upper surface of the movable plate 50 is approximately the same as an inclination angle of an upper surface of the supply tray main body 92. In this state, the supply tray 91 can support the sheet SH with the maximum number of laminated sheets. When the movable plate 50 is at the first position and the supply roller 41 abuts on the uppermost sheet SH of the maximum number of laminated sheets SH, the posture of the holder 42F becomes the appropriate posture illustrated in FIG. 5.

As illustrated in FIG. 6, when the movable plate 50 is at the second position, the left end part of the movable plate 50 is at a position opposite to the upper end part of the regulation surface 35K of the first chute member 35, and the upper surface of the movable plate 50 is in a state of being extended approximately horizontally at the same height as that of the conveyance surface 35G of the first chute member 35. In this state, the supply tray 91 can support about one to several sheets SH. When the movable plate 50 is at the second position and the supply roller 41 abuts on the uppermost sheet SH of the about one to several sheets SH, the posture of the holder 42F becomes the appropriate posture illustrated in FIG. 6.

When the controller 7 determines that the posture of the holder 42F is in a state of descending beyond an allowable range from the appropriate postures illustrated in FIGS. 5 and 6 based on a detection signal of the holder posture detection sensor 42J, the second drive source M2 is operated, and the movable plate 50 is rotated little by little from the first position illustrated in FIG. 5 and the like to the second position illustrated in FIG. 6 and the like, whereby the holder 42F is controlled so as to maintain the appropriate postures illustrated in FIGS. 5 and 6. At this time, it is possible to position the movable plate 50 in a desired rotation posture with high accuracy by finely changing a rotation posture of the arm 113 by rotation angle control of the second drive source M2 which is the stepping motor.

When the controller 7 rotates the movable plate 50 little by little by operating the second drive source M2, the drive force from the second drive source M2 is also transmitted to the discharge unit 60 by the second drive train 120. Accordingly, the discharge unit 60 rotates little by little from the third position illustrated in FIG. 5 and the like to the fourth position illustrated in FIG. 6 and the like in synchronization with the small rotation of the movable plate 50. At this time, the controller 7 transmits the drive force from the first drive source M1 to the discharge roller 47 by operating the first drive source M1 as necessary, and the sheet SH can be discharged through the discharge opening 69 by the discharge roller 47.

The image reading device 1 achieves miniaturization in the up and down direction by a configuration in which the discharge unit 60 rotates according to the rotation of the movable plate 50 of the sheet feed tray 91.

As illustrated in FIG. 5, when the discharge unit 60 is at the third position, the discharge opening 69, the discharge roller 47, and the discharge pinch roller 48 are at positions close to the sheet supporting surface 96A of the discharge tray 96. A state of the discharge unit 60 corresponds to a case where the number of sheets SH supported by the sheet supporting surface 96A of the discharge tray 96 is small.

As illustrated in FIG. 6, when the discharge unit 60 is at the fourth position, the discharge opening 69, the discharge roller 47, and the discharge pinch roller 48 are at positions separated upward from the sheet supporting surface 96A of the discharge tray 96. A state of the discharge unit 60 corresponds to a case where the sheet SH is supported by the sheet supporting surface 96A of the discharge tray 96 with the maximum number of laminated sheets. In other words, in this state, the discharge opening 69 of the discharge unit 60 is sufficiently separated upward from the uppermost sheet SH of the sheets SH supported by the sheet supporting surface 96A with the maximum number of laminated sheets.

<Image Reading Operation>

In the image reading device 1, when reading an image on a document supported on the document supporting surface 8A, the controller 7 operates the scanning mechanism, which is not illustrated, by controlling the scanning mechanism drive source 3M of the reading unit 3, and moves the reading sensor 3S in the right and left direction between a reading start position below a left end edge of the document supporting surface 8A and a reading end position below a right end edge thereof. Accordingly, the reading sensor 3S reads the image on the document supported on the document supporting surface 8A. Thereafter, the controller 7 operates the scanning mechanism, which is not illustrated, in a reverse direction by controlling the scanning mechanism drive source 3M of the reading unit 3, and then moves the reading sensor 3S which completes the reading from a right end to a left end in the reading unit 3, thereby returning to a standby position.

Further, in the image reading device 1, the sheet SH supported by the supply tray 91 is conveyed by the automatic conveyance mechanism 4; when reading the image on the sheet SH, the controller 7 operates the scanning mechanism, which is not illustrated, by controlling the scanning mechanism drive source 3M of the reading unit 3; and the reading sensor 3S is stopped at the stationary reading position below the reading surface 8B. Here, it is assumed that the movable plate 50 is at the first position illustrated in FIG. 5 and the like, the discharge unit 60 is at the third position illustrated in FIG. 5 and the like, and the sheet SH is in a state of not being supported by the discharge tray 96.

Next, the controller 7 determines whether or not the holder posture detection sensor 42J is in the appropriate postures illustrated in FIGS. 5 and 6 based on the detection signal of the holder posture detection sensor 42J. When the holder posture detection sensor 42J is not in the appropriate postures illustrated in FIGS. 5 and 6, the controller 7 operates the second drive source M2, the second drive train 120, and the third drive train 110. Then, the controller 7 rotates the movable plate 50 little by little from the first position illustrated in FIG. 5 and the like to the second position illustrated in FIG. 6 and the like, and controls the holder 42F so that the appropriate postures illustrated in FIGS. 5 and 6 are maintained. At this time, the discharge unit 60 also rotates little by little from the third position illustrated in FIG. 5 and the like to the fourth position illustrated in FIG. 6 and the like in synchronization with the small rotation of the movable plate 50.

Next, the controller 7 operates the first drive source M1 and the conveyance drive train 130. Accordingly, the controller 7 drives the supply roller 41, the separation roller 42, the first conveyance roller 43, the second conveyance roller 44, and the discharge roller 47, and supplies the sheet SH supported by the supply tray 91 to the conveyance guide 30, and the supplied sheet SH is sequentially conveyed along the conveyance guide 30. When the conveyed sheet SH passes over the reading surface 8B, the controller 7 reads an image on the conveyed sheet SH by the reading sensor 3S stopped at the stationary reading position. Next, the controller 7 discharges the sheet SH whose image is read out through the discharge opening 69 toward the discharge tray 96 by the discharge guide 61, the discharge roller 47, and the discharge pinch roller 48 of the discharge unit 60.

Meanwhile, the controller 7 rotates the movable plate 50 little by little toward the second position illustrated in FIG. 6 and the like according to the decrease in the number of the sheets SH supported by the supply tray 91 based on the detection signal of the holder posture detection sensor 42J, and rotates the discharge unit 60 little by little toward the fourth position illustrated in FIG. 6 and the like.

Here, not only when the discharge guide 61 is stopped but also when the discharge guide 61 rotates, the controller 7 can perform a discharge operation of the sheet SH by the discharge roller 47, by the first drive train 140 having the above-mentioned configuration. At this time, as illustrated in FIG. 12, when the position of the first axis center X1 is changed upwardly according to upward rotation of the discharge guide 61, the rotation speed of the first pulley 141 is temporarily lowered from the predetermined rotation speed by the connection between the first pulley 141 and the second pulley 142 via the timing belt 143, and the first pulley 141 attempts to perform the relative rotation with respect to the rotation shaft 47S of the discharge roller 47 in the second direction DR2. That is, the first pulley 141 attempts to lower a discharge speed of the sheet SH by the discharge roller 47. At this time, the one-way clutch 150 having the above-mentioned configuration allows the first pulley 141 to perform the relative rotation with respect to the rotation shaft 47S of the discharge roller 47 in the second direction DR2, thereby suppressing the rotation shaft 47S of the discharge roller 47 from following the first pulley 141. Accordingly, since the discharge roller 47 temporarily follows the sheet SH conveyed by the second conveyance roller 44, it is possible to suppress the discharge speed of the sheet SH from being lowered.

As illustrated in FIG. 6, when the number of sheets SH supported by the supply tray 91 decreases and the sheet SH runs out, the controller 7 stops the first drive source M1 and terminates the image reading operation.

Thereafter, the controller 7 operates the scanning mechanism, which is not illustrated, by controlling the scanning mechanism drive source 3M of the reading unit 3, and then returns the reading sensor 3S to the standby position. Further, the controller 7 operates the second drive source M2, the second drive train 120, and the third drive train 110 after confirming that the sheet SH is not supported by the discharge tray 96 by a detection means which is not illustrated, returns the movable plate 50 to the first position illustrated in FIG. 5 and the like, and returns the discharge unit 60 to the third position illustrated in FIG. 5 and the like.

<Advantages>

In the image reading device 1 according to the first exemplary embodiment, not only when the discharge guide 61 is stopped but also when the discharge guide 61 rotates, the discharge operation of the sheet SH by the discharge roller 47 can be performed by the first drive train 140 illustrated in FIGS. 7 and 8, and the like. Therefore, it is possible to increase a chance of performing the discharge operation of the sheet SH in comparison with a configuration in which the discharge operation of the sheet SH by the discharge roller 47 cannot be performed when the discharge guide 61 rotates.

Therefore, in the image reading device 1 of the first exemplary embodiment, improvement in a speed of processing including the discharge operation of the sheet SH by the discharge roller 47 and the rotation operation of the discharge guide 61 can be achieved. As a result, in the image reading device 1, the time required for the image reading operation can be shortened.

Further, in the image reading device 1, as illustrated in FIG. 8 and the like, it is possible to appropriately transmit the drive force from the first drive source M1 to the discharge roller 47 by the simple first drive train 140 including the first pulley 141 which is rotatable around the first axis center X1 together with the rotation shaft 47S of the discharge roller 47; the second pulley 142 which is rotatable around the second axis center X2 whose position is constant; and the timing belt 143 which is wound around the first pulley 141 and the second pulley 142.

Further, in the image reading device 1, as illustrated in FIG. 12 and the like, the one-way clutch 150 provided between the rotation shaft 47S of the discharge roller 47 and the first pulley 141 acts as described hereinafter. That is, when the position of the first axis center X1 is changed upward according to the upward rotation of the discharge guide 61, the first pulley 141 and the discharge roller 47 are also moved upward. At this time, the rotation speed of the first pulley 141 is temporarily lowered from the predetermined rotation speed by the connection between the first pulley 141 and the second pulley 142 via the timing belt 143, and the first pulley 141 attempts to perform the relative rotation with respect to the rotation shaft 47S of the discharge roller 47 in the second direction DR2. That is, the first pulley 141 attempts to lower the discharge speed of the sheet SH by the discharge roller 47. At this time, the one-way clutch 150 having the above-mentioned configuration allows the first pulley 141 to perform the relative rotation with respect to the rotation shaft 47S of the discharge roller 47 in the second direction DR2, thereby suppressing the rotation shaft 47S of the discharge roller 47 from following the first pulley 141. Accordingly, since the discharge roller 47 temporarily follows the sheet SH conveyed by the second conveyance roller 44, it is possible to suppress the discharge speed of the sheet SH from being lowered. As a result, in the image reading device 1, deterioration in the reading accuracy of the reading sensor 3S can be suppressed.

Further, in the image reading device 1, a relative positional relationship between the discharge guide 61 and the second pulley 142 is constant even though the discharge guide 61 rotates around the second axis center X2. Further, the second pulley 142 is rotatable independently of the discharge guide 61. Thus, when the discharge guide 61 is stopped and the discharge guide 61 rotates, the second pulley 142 can appropriately transmit the drive force from the first drive source M1 to the first pulley 141.

Further, in the image reading device 1, the automatic conveyance mechanism 4 is provided with the discharge unit 60 in which the discharge guide 61, the discharge roller 47, and the discharge pinch roller 48 are unitized. Accordingly, even though the discharge guide 61 rotates, a relative positional relationship between the discharge guide 61, the discharge roller 47, and the discharge pinch roller 48 is constant. Additionally, a relative positional relationship between the first axis center X1 and the second axis center X2 is constant. Therefore, when the discharge guide 61 is stopped and when the discharge guide 61 rotates, the second pulley 142 can appropriately transmit the drive force from the first drive source M1 to the first pulley 141, whereby the discharge roller 47 and the discharge pinch roller 48 can appropriately discharge the sheet SH through the discharge opening 69.

Further, in the image reading device 1, the first drive source M1 and the first drive train 140, and the second drive source M2 and the second drive train 120 are separately operated, thereby making it possible to appropriately perform the discharge operation of the sheet SH by the discharge roller 47 and the rotation operation of the discharge guide 61, respectively.

Further, in the image reading device 1, as illustrated in FIG. 7, the first drive train 140 is disposed on a side of the rear side frame 9B, and the second drive train 120 is disposed on a side of the front side frame 9A. According to this configuration, the first drive train 140 which performs the discharge operation of the sheet SH by the discharge roller 47 and the second drive train 120 which performs the rotation operation of the discharge guide 61 are separately disposed on one side and the other side in the axial direction of the discharge roller 47 with respect to the conveyance guide 30. As a result, in the image reading device 1, interference between the first drive train 140 and the second drive train 120 can be suppressed, and an arrangement space of both can be reduced.

Second Exemplary Embodiment

Figure 13:
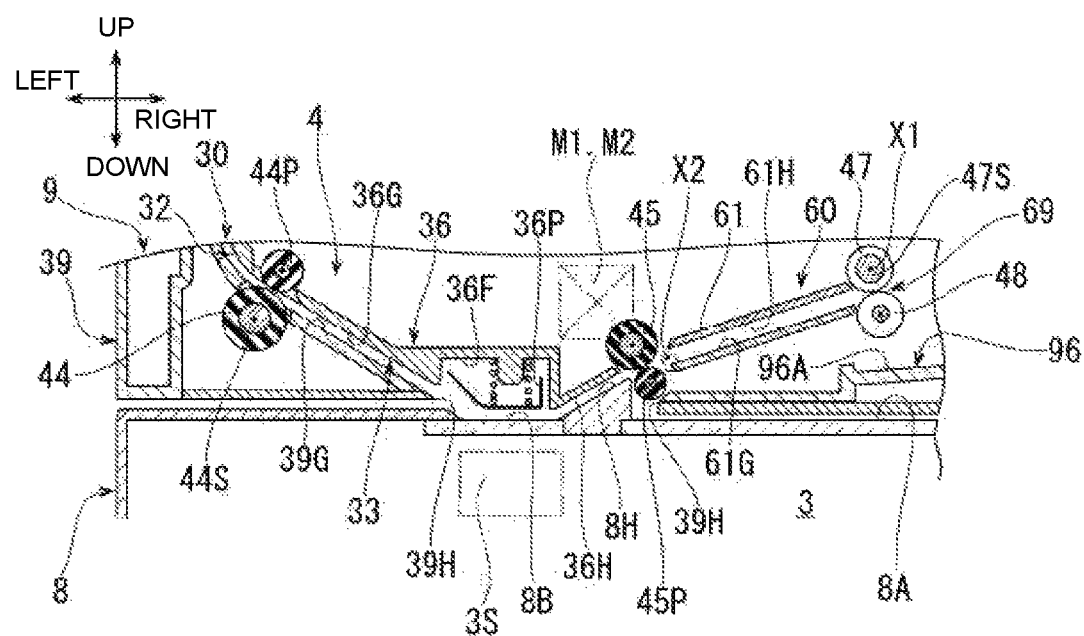
FIG. 13 is a partial cross-sectional diagram illustrating an image reading device according to a second exemplary embodiment.

As illustrated in FIG. 13, in an image reading device according to a second exemplary embodiment, the automatic conveyance mechanism 4 according to the image reading device 1 of the first exemplary embodiment is modified to further include a third conveyance roller 45 and a third pinch roller 45P. The third conveyance roller 45 is an example of "the conveyance roller provided between the reading sensor and the discharge guide" of the present disclosure. Other configurations of the second exemplary embodiment are the same as those of the first exemplary embodiment. Therefore, the same reference signs are denoted to the same configurations as those of the first exemplary embodiment, and the descriptions thereof will be omitted or simplified.

The third conveyance roller 45 and the third pinch roller 45P are disposed at a position on the right side further than the guide surface 36H and the guide protruding part 8H, and are disposed at a position on the left side further than the second axis center X2. That is, the third conveyance roller 45 and the third pinch roller 45P are provided between the reading sensor 3S stopped at the stationary reading position and the discharge guide 61.

The third conveyance roller 45 rotates in synchronization with the first conveyance roller 43 and the second conveyance roller 44 by operating the first drive source M1. The third conveyance roller 45 and the third pinch roller 45P nip a sheet SH which is conveyed by the second conveyance roller 44 and the second pinch roller 44P and then passes over the reading surface 8B, and then convey the nipped sheet SH to the discharge guide 61, the discharge roller 47, and the discharge pinch roller 48.

In the image reading device according to the second exemplary embodiment having such a configuration, in the same manner as that of the image reading device 1 of the first exemplary embodiment, the improvement in the speed of the processing including the discharge operation of the sheet SH by the discharge roller 47 and the rotation operation of the discharge guide 61 can be achieved. As a result, in the image reading device, the time required for the image reading operation can be shortened.

Further, in the image reading device, the third conveyance roller 45 conveys the sheet SH toward the discharge roller 47 at a predetermined conveyance speed without being influenced by the rotation of the discharge guide 61. Therefore, in a case where the discharge guide 61 rotates upward during a period until the sheet SH abutting on the third conveyance roller 45 and the discharge roller 47 passes over the reading surface 8B and is separated from the third conveyance roller 45, even though the one-way clutch 150 acts and the rotation shaft 47S of the discharge roller 47 is suppressed from following the first pulley 141, since the discharge roller 47 temporarily follows the sheet SH conveyed by the third conveyance roller 45, it is possible to further suppress the discharge speed of the sheet SH from being lowered. As a result, in the image reading device, the deterioration in the reading accuracy of the reading sensor 3S can be further suppressed.

Third Exemplary Embodiment

As illustrated in FIGS. 14 to 17, in an image reading device according to a third exemplary embodiment, a first drive train 340 is adopted instead of the first drive train 140 of the conveyance drive train 130 according to the image reading device 1 of the first exemplary embodiment. Further, in the image reading device, gears 301 and 302, first transmission gears 310A and 310B, and second transmission gears 320A and 320B are adopted instead of the second drive train 120 and the third drive train 110. Further, the image reading device eliminates the one-way clutch 150 according to the image reading device 1 of the first exemplary embodiment. Other configurations of the third exemplary embodiment are the same as those of the first exemplary embodiment. Therefore, the same reference signs are denoted to the same configurations as those of the first exemplary embodiment, and the descriptions thereof will be omitted or simplified.

Figure 14:
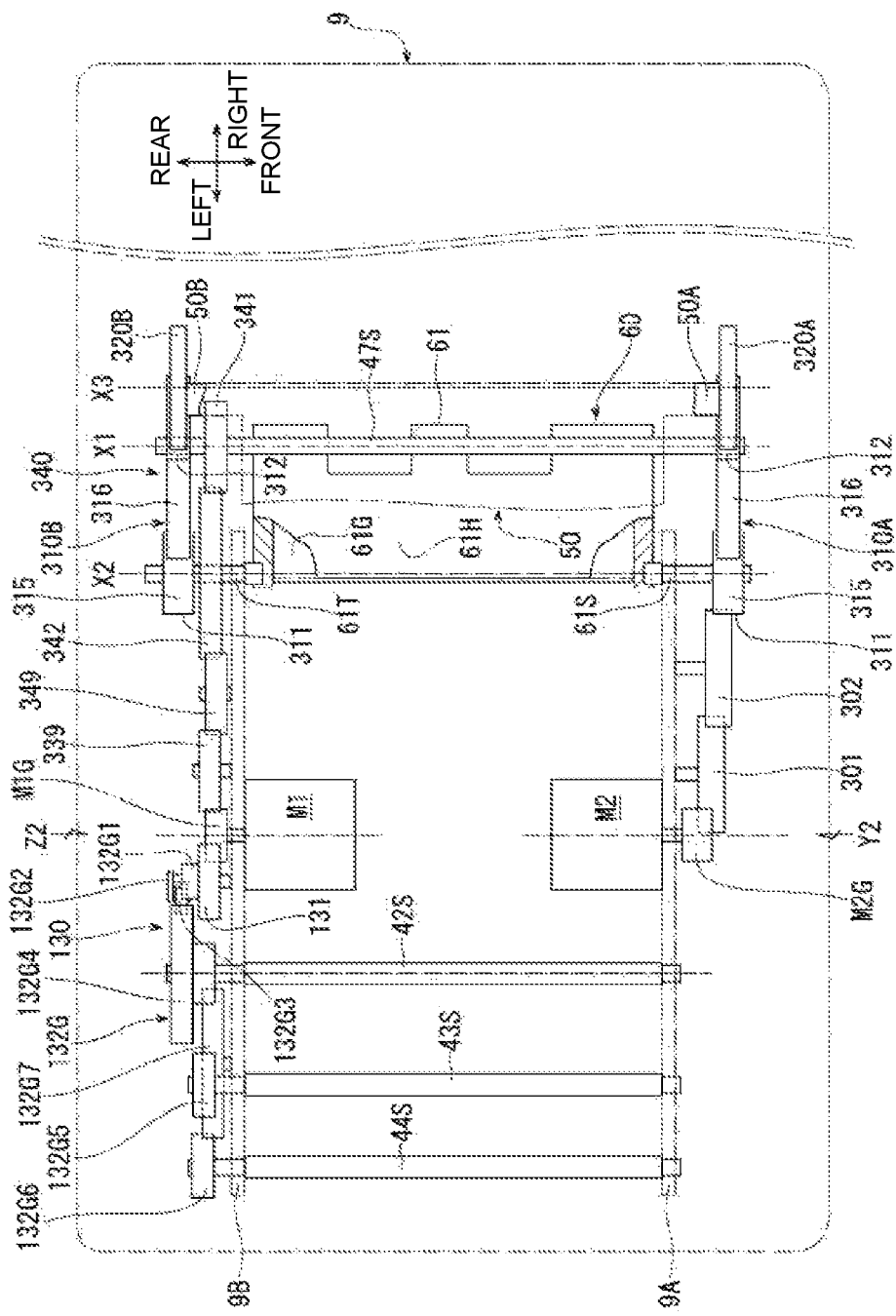
FIG. 14 is a schematic top diagram illustrating an image reading device according to a third exemplary embodiment.

Further, a length in the right and left direction of the discharge guide 61 illustrated in FIG. 14 and the like is illustrated to be shorter than a length in the right and left direction of the discharge guide 61 illustrated in FIG. 7 and the like in order to make the drawing easy to see. Further, in FIGS. 14 to 17, with respect to the conveyance drive train 130, the gear 301, the gear 302, the first transmission gears 310A and 310B, and the second transmission gears 320A and 320B, illustration of gear teeth formed on the outer peripheral surface thereof is omitted.

Figure 15:
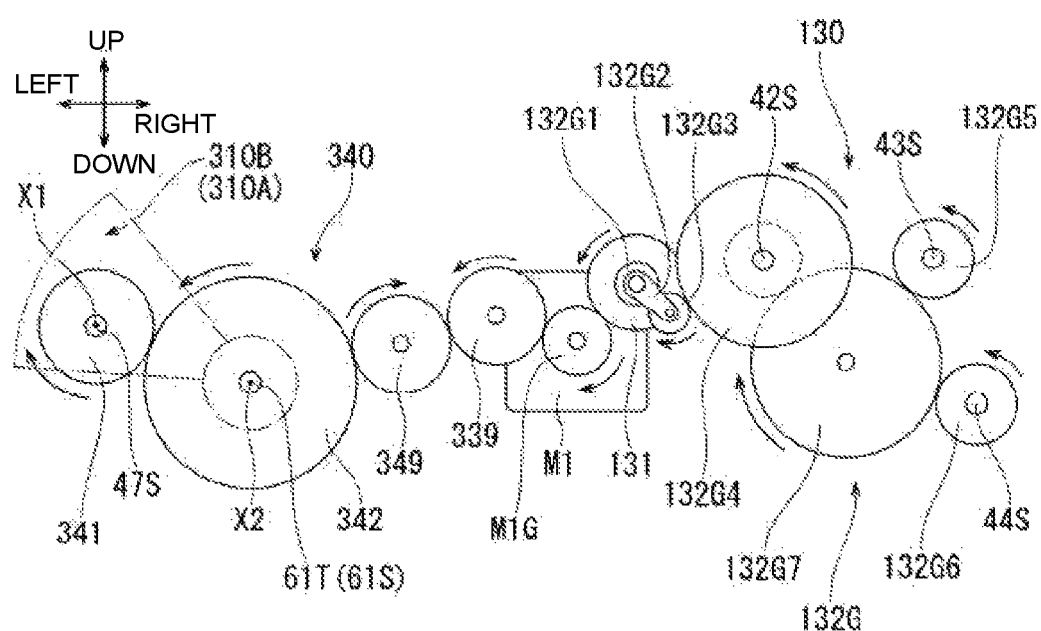
FIG. 15 is a schematic diagram illustrating a first drive source, a conveyance drive train, and the like when viewed from a direction of an arrow Z2 in FIG. 14.

As illustrated in FIGS. 14 and 15, in the conveyance drive train 130, the first drive train 340 which transmits the drive force from the first drive source M1 to the discharge roller 47 is disposed rearward further than the rear side frame 9B. The first drive train 340 includes a gear 339, a gear 349, a second gear 342, and a first gear 341. The first gear 341 is an example of the "first rotation body" of the present disclosure. The second gear 342 is an example of the "second rotation body" of the present disclosure.

Figure 16:
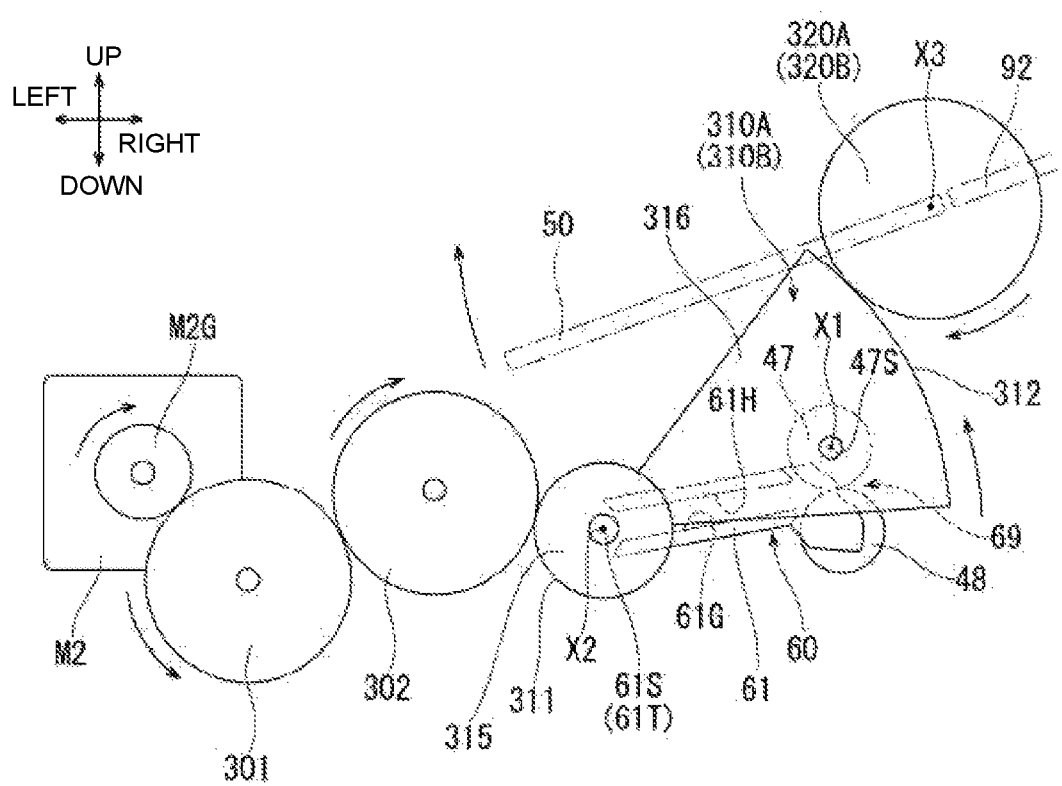
FIG. 16 is a schematic diagram illustrating a movable plate, a discharge unit, a second drive source, a first transmission gear, a second transmission gear, and the like when viewed from a direction of an arrow Y2 in FIG. 14, and is a diagram illustrating a state in which the movable plate is disposed at a first position and the discharge unit is disposed at a third position.

As illustrated in FIGS. 14 and 16, the discharge guide 61 is integrally provided with the first transmission gears 310A and 310B. The front first transmission gear 310A is fixed to a tip of the front shaft part 61S of the discharge guide 61. The rear first transmission gear 310B is fixed to a tip of the rear shaft part 61T of the discharge guide 61. The first transmission gears 310A and 310B are the same fan-shaped components. The first transmission gears 310A and 310B are rotatable around the second axis center X2 together with the discharge unit 60.

A front end part of the rotation shaft 47S is rotatably supported by the front first transmission gear 310A. A rear end part of the rotation shaft 47S is rotatably supported by the rear first transmission gear 310B. That is, the first transmission gears 310A and 310B rotatably support the rotation shaft 47S of the discharge roller 47 around the first axis center X1 while maintaining the first axis center X1 and the second axis center X2 at a predetermined gap.

The first transmission gear 310B indicated by a two-dot chain line in FIG. 15 is positioned on a front side of a sheet surface in FIG. 15 with respect to the second gear 342 and the first gear 341. On the other hand, the first transmission gear 310A is positioned on a deep side of the sheet surface in FIG. 15 with respect to the second gear 342 and the first gear 341.

As illustrated in FIGS. 14 and 15, in the first drive train 340, the gear 339 is positioned on the right side with respect to the drive gear M1G and is engaged with the drive gear M1G The gear 349 is positioned on the right side with respect to the gear 339 and is engaged with the gear 339. The second gear 342 is inserted into the rear shaft part 61T of the discharge guide 61, and is rotatable around the second axis center X2 independently of the first transmission gears 310A and 310B. The second gear 342 is disposed between the rear side frame 9B and the rear first transmission gear 310B and is engaged with the gear 349. The first gear 341 is fixed to the rear end part of the rotation shaft 47S of the discharge roller 47 and is engaged with the second gear 342.

The gear 339, the gear 349, the second gear 342, and the first gear 341 transmit the drive force from the first drive source M1 to the rotation shaft 47S of the discharge roller 47, and then rotate the discharge roller 47 in a direction of discharging the sheet SH to the discharge tray 96, that is, in the clockwise direction illustrated in FIG. 15.

The first transmission gears 310A and 310B rotatably support the rotation shaft 47S of the discharge roller 47, whereby a gap between the second axis center X2 of the second gear 342 and the first axis center X1 of the first gear 341 does not change even though the discharge guide 61 rotates. Therefore, when the discharge guide 61 is stopped and when the discharge guide 61 rotates, an engagement state between the second gear 342 and the first gear 341 is hardly changed, whereby the drive force can be appropriately transmitted from the second gear 342 to the first gear 341.

Accordingly, when the discharge guide 61 is stopped and when the discharge guide 61 rotates, the first drive train 340 transmits the drive force from the first drive source M1 to the discharge roller 47, thereby making it possible to discharge the sheet SH through the discharge opening 69 by the discharge roller 47.

Figure 17:
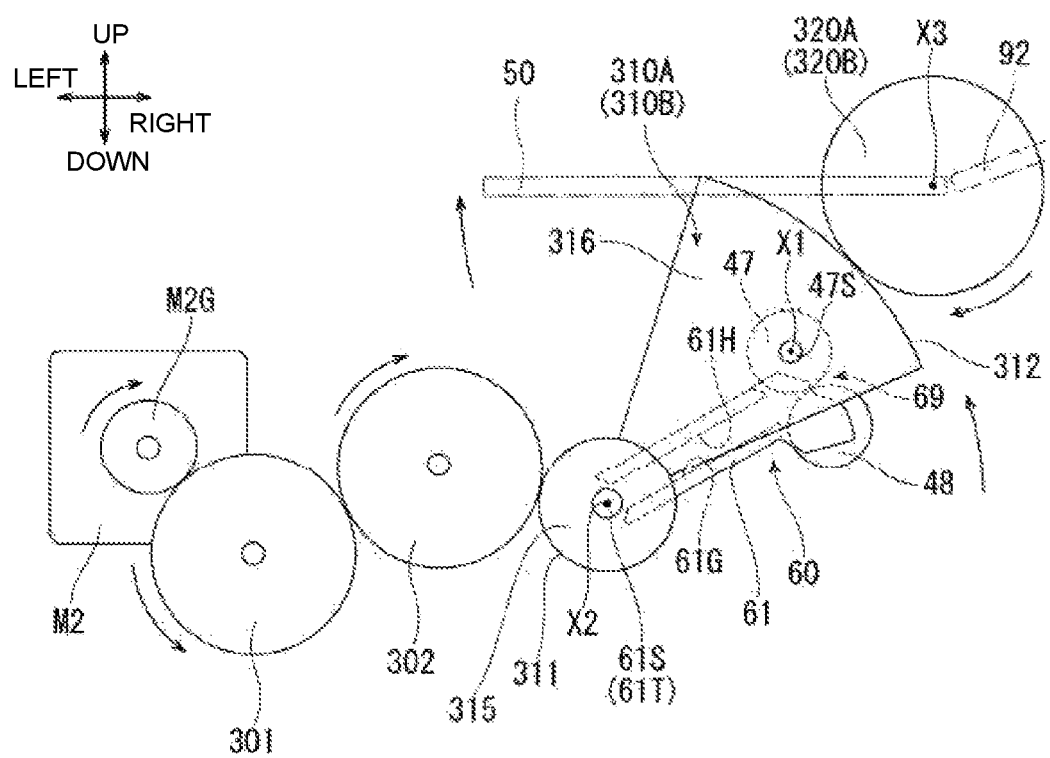
FIG. 17 is a schematic diagram same as that of FIG. 16, and is a diagram illustrating a state in which the movable plate is moved to a second position and the discharge unit is moved to a fourth position.

A plurality of arrows illustrated in FIGS. 16 and 17 indicate a rotation direction when the drive gear M2G rotates in a clockwise direction illustrated in FIGS. 16 and 17. Further, when the drive gear M2G rotates in a counter-clockwise direction illustrated in FIGS. 16 and 17, the rotation direction becomes a rotation direction opposite to each arrow illustrated in FIGS. 16 and 17.

As illustrated in FIGS. 14 and 16, the gears 301 and 302 are disposed forward further than the front side frame 9A, and are supported by a plurality of shaft parts protruding forward from the front side frame 9A. The gear 301 is positioned rightward and downward with respect to the drive gear M2G and is engaged with the drive gear M2G The gear 302 is positioned on the right side with respect to the gear 301 and is engaged with the gear 301.

The first transmission gears 310A and 310B have a fan-shaped circular arc gear 316 and a small diameter gear 315. As illustrated in FIG. 16, the fan-shaped circular arc gear 316 is formed in a fan shape including a top part of an acute angle disposed on a side of the second axis center X2 and a circular arc centering on the second axis center X2. The small diameter gear 315 is formed in a circular shape centering on the second axis center X2, and is provided integrally with the top part of the fan-shaped circular arc gear 316. The small diameter gear 315 has a diameter smaller than that of the fan-shaped circular arc gear 316. The fan-shaped circular arc gear 316 has fan-shaped gear teeth 312. The small diameter gear 315 has small diameter gear teeth 311.

As illustrated in FIGS. 14 and 16, the small diameter gear teeth 311 of the front first transmission gear 310A are positioned on the right side with respect to the gear 302 and are engaged with the gear 302. Further, in the exemplary embodiment, the small diameter gear teeth 311 of the rear first transmission gear 310B are not used.

As illustrated in FIG. 14, protruding parts 50A and 50B are formed on the movable plate 50. The front protruding part 50A protrudes forward from the right and front corner part of the movable plate 50. The rear protruding part 50B protrudes rearward from the right and rear corner part of the movable plate 50. Further, in the third exemplary embodiment, the passive part 53 of the movable plate 50 according to the first exemplary embodiment is eliminated.

The front second transmission gear 320A is fixed to the front protruding part 50A of the movable plate 50. The rear second transmission gear 320B is fixed to the rear protruding part 50B of the movable plate 50. Accordingly, the second transmission gears 320A and 320B are rotatable around the third axis center X3 integrally with the movable plate 50.

As illustrated in FIGS. 14 and 16, the front second transmission gear 320A is positioned rightward and upward with respect to the fan-shaped gear teeth 312 of the front first transmission gear 310A and is engaged with the fan-shaped gear teeth 312. The rear second transmission gear 320B is positioned rightward and upward with respect to the fan-shaped gear teeth 312 of the rear first transmission gear 310B and is engaged with the fan-shaped gear teeth 312.

Next, operations of the drive gear M2G, the gears 301 and 302, the first transmission gears 310A and 310B, and the second transmission gears 320A and 320B will be described. When the second drive source M2 rotates the drive gear M2G in the clockwise direction illustrated in FIG. 16, the drive force from the second drive source M2 is transmitted to the small diameter gear teeth 311 of the front first transmission gear 310A via the gears 301 and 302. Accordingly, since the first transmission gears 310A and 310B and the discharge guide 61 integrally rotate upward, the discharge unit 60 rotates around the second axis center X2 so as to displace the discharge opening 69 upward, and then moves from the third position illustrated in FIG. 16 to the fourth position illustrated in FIG. 17.

At the same time, the fan-shaped gear teeth 312 of the first transmission gears 310A and 310B rotate upward around the second axis center X2; the drive force from the second drive source M2 is transmitted to the second transmission gears 320A and 320B by the first transmission gears 310A and 310B; and the second transmission gears 320A and 320B rotate in the clockwise direction illustrated in FIG. 16. As a result, as illustrated in FIG. 17, the movable plate 50 rotates around the third axis center X3 so as to displace the left end part thereof upward, and then moves from the first position illustrated in FIG. 16 to the second position illustrated in FIG. 17.

Further, when the second drive source M2 rotates the drive gear M2G in the counter-clockwise direction illustrated in FIG. 17, the gears 301 and 302, the first transmission gears 310A and 310B, and the second transmission gears 320A and 320B are operated in a manner opposite to the above-mentioned operation. As a result, the discharge unit 60 rotates around the second axis center X2 so as to displace the discharge opening 69 downward, and then moves to the third position illustrated in FIG. 16. Further, the movable plate 50 rotates around the third axis center X3 so as to displace the left end part thereof downward, and then moves to the first position illustrated in FIG. 16.

That is, the drive force from the second drive source M2 is transmitted by the drive gear M2G, the gears 301 and 302, and the small diameter gear teeth 311 of the front first transmission gear 310A, and the discharge unit 60 is moved. Further, the drive force from the second drive source M2 is configured to be transmitted to the movable plate 50 by the fan-shaped gear teeth 312 of the first transmission gears 310A and 310B, and the second transmission gears 320A and 320B.

In the image reading device of the third exemplary embodiment having such a configuration, not only when the discharge guide 61 is stopped but also when the discharge guide 61 rotates, the discharge operation of the sheet SH by the discharge roller 47 can be performed by the first drive train 340 illustrated in FIGS. 14 and 15.

Therefore, in the image reading device of the third exemplary embodiment, in the same manner as that of the image reading device 1 of the first and second exemplary embodiments, it is possible to achieve the improvement in the speed of the processing including the discharge operation of the sheet SH by the discharge roller 47 and the rotation operation of the discharge guide 61. As a result, in the image reading device, the time required for the image reading operation can be shortened.

Further, in the image reading device, it is possible to appropriately transmit the drive force from the first drive source M1 to the discharge roller 47 by the simple first drive train 340 including the first pulley 341 rotatable around the first axis center X1 together with the rotation shaft 47S of the discharge roller 47; and the second gear 342 rotatable around the second axis center X2 whose position is constant.

As described above, the present disclosure is described according to the first to third exemplary embodiments, but the present disclosure is not limited to the first to third exemplary embodiments, and it goes without saying that the present disclosure can be applied by being appropriately modified within the scope not deviated from the gist thereof.

In the first to third exemplary embodiments, the movable plate 50 is configured to rotate, but is not limited to this configuration, and for example, the movable plate 50 may be linearly moved. The same also applies to the discharge guide.

INDUSTRIAL APPLICABILITY

For example, the present disclosure can be used for an image reading device, a multifunction machine, or the like.

As described in the above with reference to exemplary embodiments, according to the present disclosure, there is provided an image reading device having a supply tray which is the supply tray for supporting a sheet to be supplied and includes a movable plate for moving from a first position to a second position according to a decrease in the number of the sheets to be supported by the supply tray, the second position being higher than the first position; a discharge tray which is positioned below the supply tray and supports the sheet to be discharged; a conveyance guide which conveys the sheet from the supply tray to the discharge tray; a reading sensor for reading an image on the sheet to be conveyed on the conveyance guide; a discharge guide which includes a discharge opening for discharging the sheet conveyed by the conveyance guide to the discharge tray, and is configured to move from a third position to a fourth position according to the decrease in the number of the sheets to be supported by the supply tray, the fourth position being higher than the third position; a discharge roller which discharges the sheet through the discharge opening; a first drive source which generates a drive force; and a first drive train which transmits the drive force from the first drive source to the discharge roller, wherein the first drive train transmits the drive force form the first drive source to the discharge roller when the discharge roller moves from the third position to the fourth position, the discharge roller being configured to discharge the sheet through the discharge opening.

According to the image reading device of the present disclosure, when the discharge guide moves, the discharge operation of the sheet by the discharge roller can be performed. Therefore, it is possible to increase a chance of performing the discharge operation of the sheet in comparison with a configuration in which the discharge operation of the sheet by the discharge roller cannot be performed when the discharge guide moves.

Therefore, in the image reading device of the present disclosure, it is possible to achieve improvement in a speed of the processing including the discharge operation of the sheet by the discharge roller and the movement operation of the discharge guide. As a result, in the image reading device, the time required for an image reading operation can be shortened.

What is claimed is:

1. An image reading device comprising:
a supply tray configured to support a sheet to be supplied, the supply tray including a movable plate that is configured to be movable from a first position to a second position according to a decrease in the number of the sheet to be supported by the supply tray, the second position being higher than the first position;
a discharge tray positioned below the supply tray, the discharge tray being configured to support the sheet to be discharged;
a conveyance guide configured to convey the sheet from the supply tray to the discharge tray;
a reading sensor configured to read an image on the sheet to be conveyed on the conveyance guide;
a discharge guide including a discharge opening for discharging the sheet conveyed by the conveyance guide to the discharge tray, the discharge guide being configured to be movable from a third position to a fourth position according to the decrease in the number of the sheet to be supported by the supply tray, the fourth position being higher than the third position;
a discharge roller configured to discharge the sheet through the discharge opening;
a first drive source configured to generate a drive force; and
a first drive train configured to transmit the drive force from the first drive source to the discharge roller,
wherein the first drive train transmits the drive force from the first drive source to the discharge roller when the discharge guide moves from the third position to the fourth position, the discharge roller being configured to discharge the sheet through the discharge opening by receiving the drive force from the first drive source
wherein the discharge roller is rotatable around a first axis center whose position changes according to movement of the discharge guide from the third position to the fourth position, and
wherein the first drive train includes:

a first rotation body that is rotatable around the first axis center together with a rotation shaft of the discharge roller; and a second rotation body that is rotatable around a second axis center which is parallel to the first axis center and whose position is constant, the second rotation body being configured to transmit the drive force from the first drive source to the first rotation body, and wherein the discharge guide is rotatable around the second axis center, and wherein the second rotation body is rotatable independently of the discharge guide.

2. The image reading device according to claim 1, wherein the first rotation body is a first pulley, wherein the second rotation body is a second pulley, and wherein the first drive train further includes a belt which is wound around the first pulley and the second pulley and transmits the drive force from the first drive source from the second pulley to the first pulley.

3. The image reading device according to claim 2, wherein the first drive train further includes a one-way clutch provided between the rotation shaft of the discharge roller and the first pulley, and wherein, in a case where a rotation direction in which the discharge roller discharges the sheet through the discharge opening is defined as a first direction, and a rotation direction opposite to the first direction is defined as a second direction, the one-way clutch regulates relative rotation of the first pulley with respect to the rotation shaft of the discharge roller in the first direction, but allows the relative rotation of the first pulley with respect to the rotation shaft of the discharge roller in the second direction.

4. The image reading device according to claim 3 further comprising:

a conveyance roller configured to be provided between the reading sensor and the discharge guide.

5. The image reading device according to claim 1, wherein the first rotation body is a first gear, and wherein the second rotation body is a second gear engaged with the first gear.

6. The image reading device according to claim 1 further comprising:

a discharge unit in which the discharge guide and the discharge roller are unitized.

7. The image reading device according to claim 1 further comprising:

a second drive source configured to generate a drive force; and a second drive train configured to transmit the drive force from the second drive source to the discharge guide, and to move the discharge guide from the third position to the fourth position.

8. The image reading device according to claim 7 further comprising:

a first side frame; and a second side frame, wherein the conveyance guide is provided between the first side frame and the second side frame in an axial direction of the discharge roller, wherein the first drive train is disposed on a side of the first side frame, and wherein the second drive train is disposed on a side of the second side frame.

* * * * *